United States Patent
Kim et al.

(10) Patent No.: US 12,365,748 B2
(45) Date of Patent: Jul. 22, 2025

(54) POLYETHYLENE AND CHLORINATED POLYETHYLENE THEREOF

(71) Applicant: LG CHEM, LTD., Seoul (KR)

(72) Inventors: Hyo Min Kim, Daejeon (KR); Bog Ki Hong, Daejeon (KR); Si Jung Lee, Daejeon (KR); Sunghyun Park, Daejeon (KR); Naeun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 785 days.

(21) Appl. No.: 17/763,197

(22) PCT Filed: Jun. 10, 2021

(86) PCT No.: PCT/KR2021/007277
§ 371 (c)(1),
(2) Date: Mar. 23, 2022

(87) PCT Pub. No.: WO2021/251770
PCT Pub. Date: Dec. 16, 2021

(65) Prior Publication Data
US 2022/0363789 A1 Nov. 17, 2022

(30) Foreign Application Priority Data

Jun. 10, 2020 (KR) .................. 10-2020-0070528
Jun. 9, 2021 (KR) .................. 10-2021-0075019

(51) Int. Cl.
*C08F 110/02* (2006.01)
*C08F 8/22* (2006.01)

(52) U.S. Cl.
CPC .............. *C08F 110/02* (2013.01); *C08F 8/22* (2013.01)

(58) Field of Classification Search
CPC ...... C08F 110/02; C08F 8/22; C08F 4/65912; C08F 4/65916; C08F 2420/02; C08F 2420/06; C08F 2420/07; C08F 2420/10
See application file for complete search history.

(56) References Cited

U.S. PATENT DOCUMENTS

| | | |
|---|---|---|
| 2009/0062488 A1 | 3/2009 | Nagy et al. |
| 2012/0123013 A1 | 5/2012 | Ek et al. |
| 2013/0018154 A1 | 1/2013 | Buryak et al. |
| 2017/0029538 A1 | 2/2017 | Song et al. |
| 2017/0306069 A1 | 10/2017 | Kim et al. |
| 2018/0094084 A1 | 4/2018 | You et al. |
| 2019/0010256 A1 | 1/2019 | Lee et al. |
| 2019/0256629 A1 | 8/2019 | Chandak et al. |
| 2020/0132661 A1 | 4/2020 | Hong et al. |
| 2021/0032449 A1 | 2/2021 | Park et al. |
| 2021/0047443 A1 | 2/2021 | Jeong et al. |
| 2021/0230323 A1 | 7/2021 | Lee et al. |
| 2021/0230324 A1 | 7/2021 | Park et al. |
| 2021/0261697 A1* | 8/2021 | Ding ............ C08F 10/02 |
| 2022/0135712 A1 | 5/2022 | Cho et al. |

FOREIGN PATENT DOCUMENTS

| | | |
|---|---|---|
| CN | 111187304 A | 5/2020 |
| CN | 112088173 A | 12/2020 |
| CN | 112088174 A | 12/2020 |
| CN | 112105653 A | 12/2020 |
| CN | 113195552 A | 7/2021 |
| EP | 3 778 663 A1 | 2/2021 |
| EP | 3 778 665 A1 | 2/2021 |
| EP | 3 882 281 A1 | 9/2021 |
| JP | 2011-231260 A | 11/2011 |
| JP | 2018-507313 A | 3/2018 |
| KR | 10-2012-0096875 A | 8/2012 |
| KR | 10-2012-0123675 A | 11/2012 |
| KR | 10-2015-0058020 A | 5/2015 |
| KR | 10-2015-0058938 A | 5/2015 |
| KR | 10-2015-0139462 A | 12/2015 |
| KR | 10-2016-0121940 A | 10/2016 |
| KR | 10-2017-0030924 A | 3/2017 |
| KR | 10-2017-0122318 A | 11/2017 |
| KR | 10-2018-0058576 A | 6/2018 |
| KR | 10-2018-0068715 A | 6/2018 |
| KR | 10-2019-0074963 A | 6/2019 |
| KR | 10-2019-0078588 A | 7/2019 |
| KR | 10-2020-0026125 A | 3/2020 |
| KR | 10-2020-0071035 A | 6/2020 |
| WO | 2009/032051 A1 | 3/2009 |
| WO | 2016/167547 A1 | 10/2016 |
| WO | 2020/046051 A1 | 3/2020 |

OTHER PUBLICATIONS

Extended European Search Report issued from the European Patent Office dated Oct. 20, 2022 in connection with the corresponding European Patent Application No. 21822433.5.
Alexakis et al. "Mild Protection and Deprotection of Alcohols as Ter-Butyl in the field of Pheromone Synthesis," Tetrahedron Letters, 29(24) pp. 2951-2954 (1988).
International Search Report (with partial translation) and Written Opinion dated Sep. 27, 2021 for corresponding International Patent Application No. PCT/KR2021/007277.

* cited by examiner

*Primary Examiner* — Andrew J. Oyer
(74) *Attorney, Agent, or Firm* — Morgan, Lewis & Bockius LLP

(57) ABSTRACT

The present disclosure relates to a polyethylene, which is reacted with chlorine to prepare a chlorinated polyethylene having improved tensile strength and excellent processability during extrusion by optimizing a low molecular region in a molecular structure, and a CPE compound including the same.

17 Claims, No Drawings

POLYETHYLENE AND CHLORINATED POLYETHYLENE THEREOF

CROSS CITATION WITH RELATED APPLICATION(S)

The present application is based on, and claims priority from, Korean Patent Application Nos. 10-2020-0070528 and 10-2021-0075019, filed on Jun. 10, 2020, and Jun. 9, 2021, respectively, the disclosures of which are hereby incorporated by reference herein in their entirety.

TECHNICAL FIELD

The present invention relates to a polyethylene which may prepare a chlorinated polyethylene having excellent processability during extrusion while improving tensile strength by decreasing a low molecular region ratio in a molecular structure, and a chlorinated polyethylene thereof.

BACKGROUND

Chlorinated polyethylene prepared by reacting polyethylene with chlorine is known to have more improved physical and mechanical properties than polyethylene. In particular, since chlorinated polyethylene is able to resist harsh external environments, it may be used as a packing material such as various containers, fibers, or hoses, and the like, and a heat transfer material.

Chlorinated polyethylene is generally prepared by preparing polyethylene in a suspension and then reacting it with chlorine; or by placing polyethylene in an aqueous HCl solution and then reacting it with chlorine to replace hydrogen of the polyethylene with chlorine.

In order to fully express properties of chlorinated polyethylene, chlorine must be uniformly substituted in polyethylene, which is affected by the properties of polyethylene reacting with chlorine. In particular, chlorinated polyethylene (CPE) is widely used for electric wires and cables by compounding with inorganic additives and crosslinking agents, and may be generally prepared by reacting polyethylene with chlorine in a suspension, or by reacting polyethylene with chlorine in aqueous HCl solution. This CPE compound product requires excellent tensile strength, and strength of the compound varies depending on physical properties of the chlorinated polyethylene. In the case of general-purpose chlorinated polyethylenes which are widely known at present, polyethylene prepared using a Ziegler-Natta catalyst (Z/N) is applied, and due to a broad molecular weight distribution, uniformity in chlorine distribution is decreased in the polyethylene. There is also a disadvantage in that the tensile strength is poor when preparing the CPE compound.

Accordingly, excellent uniformity in chlorine distribution is required in chlorinated polyethylene in order to improve tensile strength and processability during extrusion. To this end, there is a continuous demand for developing a method capable of preparing a polyethylene having a molecular structure with a large of medium/high molecular regions.

DETAILED DESCRIPTION OF THE INVENTION

Technical Problem

In the present disclosure, there is provided a polyethylene which may prepare a chlorinated polyethylene having excellent processability during extrusion while improving tensile strength due to a narrow molecular weight distribution by decreasing a low molecular region ratio in a molecular structure, and a chlorinated polyethylene thereof.

In addition, the present disclosure is to provide a process for preparing the polyethylene.

Technical Solution

In an embodiment of the present disclosure, there is provided a polyethylene having an integral value of a region, where Log Mw is 4.0 or less, of 5.0% or less based on the total integral value, and an integral value of a region, where Log Mw is 4.5 or less, of 23% or less based on the total integral value, in a GPC curve graph having the x-axis of log MW and the y-axis of dw/d log Mw; and a molecular weight distribution (Mw/Mn) of 4.0 or less.

In addition, the present disclosure provides a process for preparing the polyethylene.

The present disclosure also provides a chlorinated polyethylene prepared by reacting the polyethylene with chlorine.

Advantageous Effects

A polyethylene according to the present disclosure has a decreased low molecular region in a molecular structure and is reacted with chlorine to prepare a chlorinated polyethylene having excellent chlorination productivity and thermal stability.

DETAILED DESCRIPTION OF THE EMBODIMENTS

In the present disclosure, the terms "the first", "the second", etc. are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess", when used in this specification, specify the presence of stated features, numbers, steps, components, or combinations thereof, but do not preclude the presence or addition of one or more other features, numbers, steps, components, or combinations thereof.

The terminology "about" or "substantially" used throughout the specification is intended to have meanings close to numerical values or ranges specified with an allowable error and intended to prevent accurate or absolute numerical values disclosed for understanding of the present invention from being illegally or unfairly used by any unconscionable third party.

Further, "parts by weight" as used herein refers to a relative concept of a ratio of the weight of the remaining material based on the weight of a specific material. For example, in a mixture containing 50 g of material A, 20 g of material B, and 30 g of material C, the amounts of materials B and C based on 100 parts by weight of material A are 40 parts by weight and 60 parts by weight, respectively.

In addition, "wt % (% by weight)" refers to an absolute concept of expressing the weight of a specific material in percentage based on the total weight. In the above-described mixture, the contents of materials A, B, and C based on 100% of the total weight of the mixture are 50% by weight, 20% by weight, and 30% by weight, respectively. At this time, a sum of the contents of respective components does not exceed 100% by weight.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in more detail.

According to one embodiment of the present disclosure, there is provided a polyethylene which may prepare a chlorinated polyethylene having excellent processability during extrusion while improving tensile strength by implementing a molecular structure having an optimized low molecular region.

The polyethylene is characterized in that an integral value of a region, where Log Mw is 4.0 or less, is 5.0% or less of the total integral value, and an integral value of a region, where Log Mw is 4.5 or less, is 23% or less of the total integral value, in a GPC curve graph having the x-axis of log MW and the y-axis of dw/d log Mw; and a molecular weight distribution (Mw/Mn) of 4.0 or less.

The polyethylene according to the present disclosure may be used to maximize tensile strength of a chlorinated polyethylene (CPE) compound and to expand the market of rubber materials (SBR, NBR, etc.), thereby reducing costs and expand the chlorinated polyethylene (CPE) market by optimizing a polymer structure, realizing a narrow molecular weight distribution, minimizing a low molecular region in a molecular structure, improving crosslinking efficiency, and regulating medium/high molecular regions.

In particular, the polyethylene of the present disclosure is characterized in that it has a molecular structure having a low ratio of a low molecular region while having a high ratio of medium/high molecular regions in the molecular structure, and has a high degree of crosslinking with a narrow molecular weight distribution. As a result, an elongational viscosity (210° C., 0.5 s) for crosslinked polyethylene is increased, and it is possible to prepare a chlorinated polyethylene having excellent chlorination productivity, thermal stability, and mechanical properties.

The polyethylene according to the present disclosure may be an ethylene homopolymer without a separate copolymer.

With regard to the polyethylene, an integral value of a region, where Log Mw is 4.0 or less, is 5.0% or less of the total integral value, and an integral value of a region, where Log Mw is 4.5 or less, is 23% or less of the total integral value, in a GPC curve graph having the x-axis of log MW and the y-axis of dw/d log Mw, and therefore, the low molecular region ratio is optimized, and at the same time, a narrow molecular weight distribution (Mw/Mn) of 4.0 or less is realized. As a result, it is possible to provide a chlorinated polyethylene having excellent processability during extrusion while improving tensile strength, and to improve tensile strength of a CPE compound.

Specifically, with regard to the polyethylene, an integral value of a region, where Log Mw is 4.0 or less, may be about 5.0% or less or about 0.5% to about 5.0%, or about 4.98% or less or about 1.0% to about 4.98%, or about 4.9% or less or about 1.5% to about 4.9%, or about 4.85% or less or about 1.8% to about 4.85%, or about 4.8% or less or about 2.0% to about 4.8% or about 2.5% to about 4.8% or about 2.8% to about 4.8% or about 3.5% to about 4.8% of the total integral value, in the above-described GPC curve graph. Further, with regard to the polyethylene, an integral value of a region, where Log Mw is 4.5 or less, may be about 23% or less or about 10% to about 23%, or about 22.5% or less or about 11% to about 22.5%, or about 22% or less or about 12% to about 22%, or about 21.5% or less or about 13% to about 21.5%, or about 21.2% or less or about 14% to about 21.2% or about 18% to about 21.2% or about 19% to about 21.2% of the total integral value, in the above-described GPC curve graph. The polyethylene may have the above-described optimized low molecular region ratio in the molecular structure in the GPC graph, thereby improving mechanical properties such as tensile strength, etc. while securing high chlorination productivity and processability due to occurrence of a uniform chlorination reaction.

The polyethylene of the present disclosure is characterized in that the low molecular region ratio in the molecular structure is within the optimized range, as described above, and at the same time, a molecular weight distribution (Mw/Mn) is also optimized.

The molecular weight distribution of the polyethylene may be about 4.0 or less or about 2.0 to about 4.0, or about 3.8 or about 2.1 to about 3.8, or about 3.6 or less or about 2.2 to about 3.8, or about 3.6 or less or about 2.3 to about 3.6, or about 3.2 or less or about 2.5 to about 3.2, or about 2.7 to about 3.2. This means that the molecular weight distribution of the polyethylene is narrow. When the molecular weight distribution is broad, a difference in the molecular weight between polyethylenes is large, and thus the chlorine contents of the polyethylenes after the chlorination reaction may vary, and thus the uniform distribution of chlorine is difficult. In addition, when a low molecular weight component is melted, fluidity becomes high, and as a result, pores of polyethylene particles may be blocked to reduce the chlorination productivity. In contrast, since the polyethylene of the present disclosure has the molecular weight distribution as described above, a difference in the molecular weight between polyethylenes after the chlorination reaction is not large, and therefore, chlorine may be uniformly substituted.

For example, the ratios of the regions where Log Mw is 4.0 or less and 4.5 or less in the GPC curve graph and the molecular weight distribution (Mw/Mn, polydispersity index) may be measured using gel permeation chromatography (GPC, manufactured by Water).

Here, the molecular weight distribution (Mw/Mn, polydispersity index) may be determined by measuring a weight average molecular weight (Mw) and a number average molecular weight (Mn) of the polyethylene, and then dividing the weight average molecular weight by the number average molecular weight.

In particular, the weight average molecular weight (Mw) and the number average molecular weight (Mn) of polyethylene may be measured using a polystyrene calibration curve. For example, Waters PL-GPC220 may be used as the gel permeation chromatography (GPC) instrument, and a Polymer Laboratories PLgel MIX-B 300 mm length column may be used. In this regard, the measurement temperature may be 160° C., and 1,2,4-trichlorobenzene may be used as a solvent, and a flow rate of 1 mL/min may be applied. The polyethylene sample may be pretreated by dissolving in 1,2,4-trichlorobenzene containing 0.0125% of BHT at 160° C. for 10 hours using a GPC analyzer (PL-GP220), and the sample was prepared at a concentration of 10 mg/10 mL, and then may be supplied in an amount of 200 microleters (μL). Mw and Mn values may be obtained using a calibration curve formed using polystyrene standards. 9 kinds of polystyrene standards are used, the polystyrene standards having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

The polyethylene may have a weight average molecular weight of about 150000 to about 200000 g/mol. Preferably, the polyethylene may have a weight average molecular weight of about 151000 g/mol or more, or about 152000 g/mol or more, or about 153000 g/mol or more, or about 154000 g/mol or more, or about 155000 g/mol or more. Further, the polyethylene may have a weight average molecular weight of about 198000 g/mol or less, or about 195000 g/mol or less, or about 192000 g/mol or less, or about 190000 g/mol or less, or about 188000 g/mol or less, or about 186000 g/mol or less, or about 185000 g/mol or less. This means that the polyethylene has a high molecular weight and a high ratio of medium/high molecular weight regions.

Meanwhile, the polyethylene exhibits an optimum range of complex viscosity ($\eta^*(\omega 500)$) of about 780 Pa·s to about 950 Pa·s, as measured at a frequency (w) of 500 rad/s. Specifically, the complex viscosity ($\eta^*(\omega 500)$) may be about 800 Pa·s or more, or about 820 Pa·s or more, or about 830 Pa·s or more, or about 840 Pa·s or more, or about 850 Pa·s or more, or about 860 Pa·s or more, or about 870 Pa·s or more, or about 880 Pa·s or more, and about 940 Pa·s or less, or about 930 Pa·s or less, or about 920 Pa·s or less, or about 915 Pa·s or less, or about 910 Pa·s or less, or about 910 Pa·s or less, as measured at a frequency ($\omega$) of 500 rad/s. The polyethylene of the present disclosure may maintain the above range of complex viscosity ($\eta^*(\omega 500)$), as measured at a frequency ($\omega$) of 500 rad/s, in terms of improving chlorination productivity while appropriately maintaining a processing load during extrusion for processing a compound product after a chlorination process.

In particular, the complex viscosity may be measured using a rotary rheometer, for example, a rotary rheometer ARES (Advanced Rheometric Expansion System, ARES G2) of TA instruments. The polyethylene samples were set using parallel plates with a diameter of 25.0 mm at 190° C. such that the gap between plates becomes 2.0 mm. Measurements were conducted in a dynamic strain frequency sweep mode at a strain rate of 5% in the frequency range of 0.05 rad/s to 500 rad/s. 10 points for each decade, a total of 41 points, may be measured.

Generally, in the case of perfectly elastic materials, deformation occurs in proportion to an elastic shear stress, and this is called Hooke's law. Also, in the case of purely viscous liquids, deformation occurs in proportion to a viscous shear stress, and this is called Newtonian law. The perfectly elastic material can again recover the deformation if the elastic shear stress is removed by accumulation of the elastic energy. Also, the perfectly viscose material does not recover the deformation even if the elastic shear stress is removed, because all of energy is dissipated by the deformation. Also, the viscosity of the material itself does not change.

However, a polymer in a molten state has intermediate properties between properties of the perfectly elastic material and those of the viscose liquid, and this is called viscoelasticity. That is, the polymer has characteristics that, if it receives a shear stress in a molten state, the deformation is not in proportion to the shear stress, and the viscosity is changed according to the shear stress, which is called non-Newtonian fluids. These characteristics are due to the complexity of the deformation caused by the shear stress because the polymer has a huge molecular size and a complex molecular structure.

In particular, when a molded article is manufactured using a polymer, a shear thinning phenomenon among the characteristics of the non-Newtonian fluid is considered important. The shear thinning phenomenon refers to a phenomenon where the viscosity of the polymer decreases as the shear rate increases. A method of molding the polymer is determined according to such shear thinning properties. In particular, when manufacturing a large molded article such as a large diameter pipe or a complex pipe as in the present disclosure, or a molded article requiring high-speed extrusion of the polymer, considerable pressure must be applied to the molten polymer. Therefore, unless the polymer exhibits the shear thinning properties, the manufacture of the molded article is difficult. For this reason, the shear thinning properties are considered important.

Therefore, in the present disclosure, the shear thinning properties are measured through complex viscosity ($\eta$[Pa·s]) according to frequency ($\omega$[rad/s]). In particular, by optimizing the complex viscosity at a frequency ($\omega$) of 500 rad/s, excellent chlorination productivity and excellent compound properties may be realized. In particular, it is possible to predict the range of physical properties of the chlorinated polyethylene, such as the Moony viscosity (MV), through complex viscosity at a frequency ($\omega$) of 500 rad/s.

Meanwhile, the polyethylene may have a density of about 0.945 g/cm$^3$ to about 0.960 g/cm$^3$, or about 0.946 g/cm$^3$ to 0.958 g/cm$^3$, or about 0.947 g/cm$^3$ to 0.955 g/cm$^3$, or about 0.948 g/cm$^3$ to 0.952 g/cm$^3$. In particular, the polyethylene has a density of about 0.945 g/cm$^3$ or more, which means that the polyethylene has a high content of crystalline part and is dense, and therefore, the crystal structure of the polyethylene is difficult to change during chlorination. However, when the density of the polyethylene exceeds about 0.960 g/cm$^3$, the content of crystalline structure of the polyethylene becomes too high, and as a result, TREF crystallinity distribution becomes too wide and high, and the molecular weight distribution becomes wide, and the heat of fusion increases during CPE processing and processability may decrease. Accordingly, it is desirable that the polyethylene of the present disclosure has a density in the above range, in terms of securing excellent extrusion processability and size stability even in a high-speed extrusion process when applied to electric wires or cables, and the like, and exhibiting excellent mechanical properties such as tensile strength.

Further, the polyethylene may have a melt index MI$_5$ of about 0.8 g/10 min to about 4.5 g/10 min, as measured in accordance with the ASTM D 1238 method under conditions of a temperature of 190° C. and a load of 5 kg. The melt index MI$_5$ may be about 4.5 g/10 min or less in terms of securing excellent thermal stability, because the lower the MI, the higher the viscosity, and thus changes in the polyethylene particle shape is small in a high-temperature slurry state for chlorination. In a more preferred range, the melt index MI$_5$ may be about 4.4 g/10 min or less, or about 4.3 g/10 min or less, or about 4.2 g/10 min or less, or about 4.1 g/10 min or less, or about 4.0 g/10 min or less, or about 3.9 g/10 min or less. Further, the melt index MI$_5$ may be 0.8 g/10 min or more in terms of securing excellent processability, because the viscosity decreases as the MI increases. Specifically, the melt index MI$_5$ may be about 0.9 g/10 min or more, or about 1.0 g/10 min or more, or about 1.1 g/10 min or more, or about 1.2 g/10 min or more, or about 1.5 g/10 min or more, or about 2.0 g/10 min or more, or about 2.5 g/10 min or more, or about 3.5 g/10 min. In particular, it is desirable that the polyethylene has the melt index MI$_5$ in the above range, in terms of securing excellent extrusion processability and size stability even in a high-speed extrusion process when applied to electric wires or cables, and the like, and exhibiting excellent mechanical properties such as tensile strength.

Further, with regard to the polyethylene, an elongational viscosity (210° C., 0.5 s) for crosslinked polyethylene may be about 2800000 Pa·s or more, or about 2800000 Pa·s to about 4000000 Pa·s, or about 2900000 Pa·s or more, or about 2900000 Pa·s to about 3800000 Pa·s, or about 3000000 Pa·s or more, or about 3000000 Pa·s to about 3600000 Pa·s, or about 3050000 Pa·s or more, or about 3050000 Pa·s to about 3400000 Pa·s. The elongational viscosity for crosslinked PE may be about 2800000 Pa·s or more in terms of securing excellent mechanical properties. However, the elongational viscosity for crosslinked PE may be about 4000000 Pa·s or less, in terms of securing more excellent extrusion processability as the elongational viscosity for crosslinked polyethylene is lower. A method of measuring the elongational viscosity (210° C., 0.5 s) for crosslinked polyethylene is as described in Test Example 1 to be described later.

For example, with regard to the polyethylene, the elongational viscosity (210° C., 0.5 s) for crosslinked polyethylene refers to an elongational viscosity of a compound sheet in which the polyethylene is crosslinked under conditions of 190° C. and 10 min, and represents a molecular structure having an excellent degree of crosslinking. The elongational viscosity (210° C., 0.5 s) for crosslinked polyethylene may be measured by pulling a molten sample at a Hencky rate of 0.1/s at 210° C., specifically, using ARES-G2 of TA Instruments and EVF (Elongation Viscosity Fixture) accessories.

Further, the polyethylene may have an MDR torque (MH-ML, measured at 180° C. for 10 min) of about 10 Nm or more or about 10 Nm to about 18 Nm, or about 11 Nm or more or about 11 Nm to about 17 Nm, or about 12 Nm or more or about 12 Nm to about 17 Nm, or about 13 Nm or more or about 13 Nm to about 16 Nm. The MDR torque may be about 10 Nm or more in terms of securing excellent mechanical properties. However, the MDR torque may be about 18 Nm or less in terms of securing excellent extrusion processability and size stability even in a high-speed extrusion process when applied to electric wires or cables, and the like.

Here, the MDR torque (MH-ML, measured at 180° C. for 10 min) of the polyethylene refers to the degree of crosslinking. The higher the degree of crosslinking, the higher the MH-ML. The high MDR torque means an excellent crosslinking efficiency when the same crosslinking agent is applied. The MDR torque of the polyethylene may be measured, for example, using a moving die rheometer (MDR). An MH value and an ML value are measured at 180° C. for 10 min, and the ML value is subtracted from the MH value to calculate the MDR torque (MH-ML). Here, the MH is a maximum vulcanizing torque measured at full cure, and the ML is a minimum vulcanizing torque stored. A method of measuring the MDR torque of the polyethylene is as described in Test Example 1 to be described later, and the detailed description is omitted herein.

Meanwhile, according to another embodiment of the present disclosure, there is provided a process for preparing the above-described polyethylene.

The process for preparing the polyethylene according to the present disclosure comprises the step of polymerizing ethylene in the presence of at least one first metallocene compound represented by the following Chemical Formula 1; and at least one second metallocene compound selected from compounds represented by the following Chemical Formula 2:

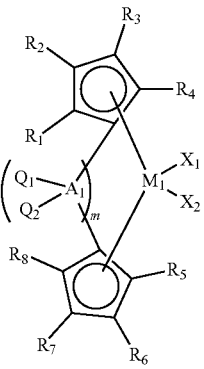

[Chemical Formula 1]

in Chemical Formula 1,
any one or more of $R_1$ to $R_8$ are —$(CH_2)_n$—OR, wherein R is $C_{1-6}$ linear or branched alkyl, and n is an integer of 2 to 6;
the rest of $R_1$ to $R_8$ are the same as or different from each other, and are each independently a functional group selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl; or two or more of the substituents that are adjacent to each other are connected with each other to form a $C_{6-20}$ aliphatic or aromatic ring unsubstituted or substituted with a $C_{1-10}$ hydrocarbyl group;
$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;
$A_1$ is carbon (C), silicon (Si), or germanium (Ge);
$M_1$ is a Group 4 transition metal;
$X_1$ and $X_2$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and
m is an integer of 0 or 1,

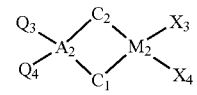

[Chemical Formula 2]

in Chemical Formula 2,
$Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;
$A_2$ is carbon (C), silicon (Si), or germanium (Ge);
$M_2$ is a Group 4 transition metal;
$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and
any one of $C_1$ and $C_2$ is represented by the following Chemical Formula 3a or 3b, and the other is represented by the following Chemical Formula 3c, 3d, or 3e;

[Chemical Formula 3a]

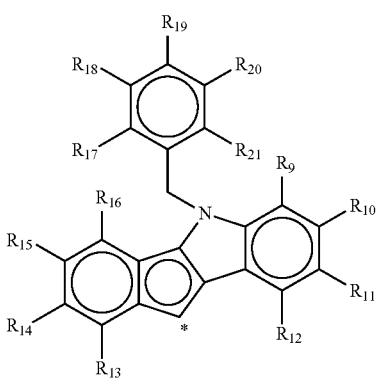

[Chemical Formula 3b]

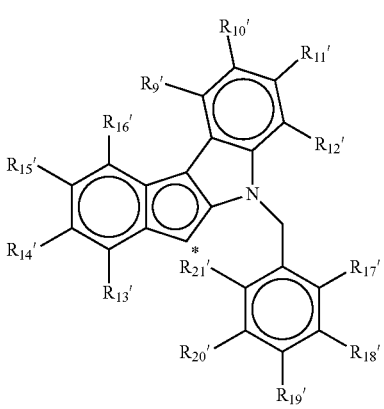

[Chemical Formula 3c]

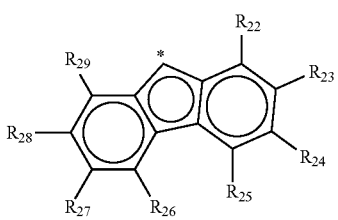

[Chemical Formula 3d]

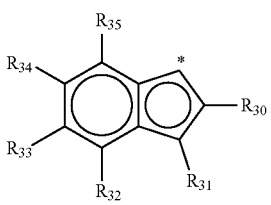

[Chemical Formula 3e]

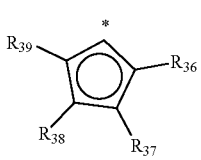

in Chemical Formulae 3a, 3b, 3c, 3d and 3e, $R_9$ to $R_{21}$ and $R_{9'}$ to $R_{21'}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that one or more of $R_{17}$ to $R_{21}$ or one or more of $R_{17'}$ to $R_{21'}$ are $C_{1-20}$ haloalkyl;

$R_{22}$ to $R_{39}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, or two or more of $R_{22}$ to $R_{39}$ that are adjacent to each other may be connected with each other to form a $C_{6-20}$ aliphatic or aromatic ring unsubstituted or substituted with a $C_{1-10}$ hydrocarbyl group; and

* represents a site of binding to $A_2$ and $M_2$.

Unless otherwise specified herein, the following terms may be defined as follows.

The halogen may be fluorine (F), chlorine (Cl), bromine (Br) or iodine (I).

The hydrocarbyl group is a monovalent functional group in which a hydrogen atom is removed from hydrocarbon. The hydrocarbyl group may include an alkyl group, an alkenyl group, an alkynyl group, an aryl group, an aralkyl group, an aralkenyl group, an aralkynyl group, an alkylaryl group, an alkenylaryl group, or an alkynylaryl group, and the like. In addition, the $C_{1-30}$ hydrocarbyl group may be a $C_{1-20}$ hydrocarbyl group or a $C_{1-10}$ hydrocarbyl group. For example, the hydrocarbyl group may be linear, branched, or cyclic alkyl. More specifically, the $C_{1-30}$ hydrocarbyl group may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, or a cyclohexyl group, and the like; or an aryl group such as phenyl, biphenyl, naphthyl, anthracenyl, phenanthrenyl, or fluorenyl, and the like. Moreover, it may be alkylaryl such as methylphenyl, ethylphenyl, methylbiphenyl, or methylnaphthyl, and the like, or arylalkyl such as phenylmethyl, phenylethyl, biphenylmethyl, or naphthylmethyl, and the like. It may also be alkenyl such as allyl, ethenyl, propenyl, butenyl, or pentenyl, and the like In addition, the $C_{1-20}$ alkyl may be linear, branched, or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. For example, the $C_{1-20}$ alkyl may include methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, or cyclooctyl, and the like, but is not limited thereto.

The $C_{2-20}$ alkenyl includes linear or branched alkenyl, and may specifically include allyl, ethenyl, propenyl, butenyl, or pentenyl, and the like, but is not limited thereto.

The $C_{1-20}$ alkoxy may include methoxy, ethoxy, iso-propoxy, n-butoxy, tert-butoxy, or cyclohexyloxy, and the like, but is not limited thereto.

The $C_{2-20}$ alkoxyalkyl group is a functional group in which one or more hydrogens of the above-mentioned alkyl are substituted with alkoxy. Specifically, the $C_{2-20}$ alkoxyalkyl group may include methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, or tert-butoxyhexyl, and the like, but is not limited thereto.

The $C_{6-40}$ aryloxy may include phenoxy, biphenoxyl, or naphthoxy, and the like, but is not limited thereto.

The $C_{7-40}$ aryloxyalkyl group is a functional group in which one or more hydrogens of the above-mentioned alkyl are substituted with aryloxy. Specifically, the $C_{7-40}$ aryloxyalkyl group may include phenoxymethyl, phenoxyethyl, or phenoxyhexyl, and the like, but is not limited thereto.

The $C_{1-20}$ alkylsilyl or the $C_{1-20}$ alkoxysilyl is a functional group in which 1 to 3 hydrogens of —$SiH_3$ are substituted with 1 to 3 alkyl groups or alkoxy groups described above. Specifically, it may include alkylsilyl such as methylsilyl, dimethylsilyl, trimethylsilyl, dimethylethylsilyl, diethylmethylsilyl, or dimethylpropylsilyl, and the like; alkoxysilyl such as methoxysilyl, dimethoxysilyl, trimethoxysilyl, or dimethoxyethoxysilyl, and the like; or alkoxyalkylsilyl such as methoxydimethylsilyl, diethoxymethylsilyl, or dimethoxypropylsilyl, and the like, but is not limited thereto.

The $C_{1-20}$ silylalkyl is a functional group in which one or more hydrogens of the above-mentioned alkyl are substituted with silyl. Specifically, the $C_{1-20}$ silylalkyl may include —$CH_2$—$SiH_3$, methylsilylmethyl, or dimethylethoxysilylpropyl, and the like, but is not limited thereto.

In addition, the $C_{1-20}$ alkylene is the same as the above-mentioned alkyl except that it is a divalent substituent. Specifically, the $C_{1-20}$ alkylene include methylene, ethylene, propylene, butylene, pentylene, hexylene, heptylene, octylene, cyclopropylene, cyclobutylene, cyclopentylene, cyclohexylene, cycloheptylene, or cyclooctylene, and the like, but is not limited thereto.

The $C_{6-20}$ aryl may be a monocyclic, bicyclic or tricyclic aromatic hydrocarbon. For example, the $C_{6-20}$ aryl may include phenyl, biphenyl, naphthyl, anthracenyl, phenanthrenyl, or fluorenyl, and the like, but is not limited thereto.

The $C_{7-20}$ alkylaryl may refer to a substituent in which one or more hydrogens of the aromatic ring are substituted with the above-mentioned alkyl. For example, the $C_{7-20}$ alkylaryl may include methylphenyl, ethylphenyl, methylbiphenyl, or methylnaphthyl, and the like, but is not limited thereto.

The $C_{7-20}$ arylalkyl may refer to a substituent in which one or more hydrogens of the alkyl are substituted with the above-mentioned aryl. For example, the $C_{7-20}$ arylalkyl may include phenylmethyl, phenylethyl, biphenylmethyl, or naphthylmethyl, and the like, but is not limited thereto.

In addition, the $C_{6-20}$ arylene is the same as the above-mentioned aryl except that it is a divalent substituent. Specifically, the $C_{6-20}$ arylene may include phenylene, biphenylene, naphthylene, anthracenylene, phenanthrenylene, or fluorenylene, and the like, but is not limited thereto.

The Group 4 transition metal may be titanium (Ti), zirconium (Zr), hafnium (Hf), or rutherfordium (Rf). Specifically, the Group 4 transition metal may be titanium (Ti), zirconium (Zr), or hafnium (Hf). More specifically, it may be zirconium (Zr), or hafnium (Hf), but is not limited thereto.

Further, the Group 13 element may be boron (B), aluminum (Al), gallium (Ga), indium (In), or thallium (Tl). Specifically, the Group 13 element may be boron (B) or aluminum (Al), but is not limited thereto.

Meanwhile, the first metallocene compound may be represented by any one of the following Chemical Formulae 1-1 to 1-4:

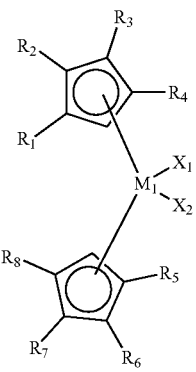

[Chemical Formula 1-1]

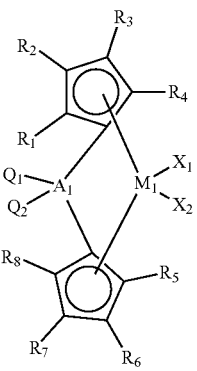

[Chemical Formula 1-2]

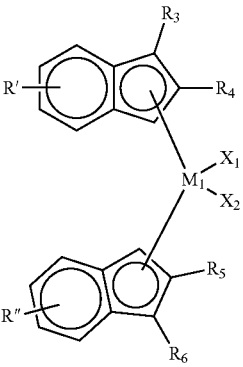

[Chemical Formula 1-3]

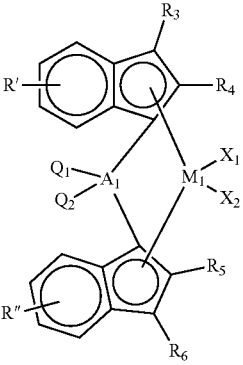

[Chemical Formula 1-4]

in Chemical Formulae 1-1 to 1-4, $Q_1$, $Q_2$, $A_1$, $M_1$, $X_1$, $X_2$, and $R_1$ to $R_8$ are the same as defined in Chemical Formula 1, and R' and R" are the same as or different from each other, and are each independently a $C_{1-10}$ hydrocarbyl group.

Preferably, the first metallocene compound may have a structure including a bis-cyclopentadienyl ligand, and more preferably, including cyclopentadienyl ligands configured symmetrically with respect to a transition metal. More preferably, the first metallocene compound may be represented by Chemical Formula 1-1.

In Chemical Formula 1 and Chemical Formulae 1-1 to 1-4, any one or more of $R_1$ to $R_8$ may be —$(CH_2)_n$—OR, wherein R is $C_{1-6}$ linear or branched alkyl, and n is an integer of 2 to 6. Specifically, R is $C_{1-4}$ linear or branched alkyl, and n is an integer of 4 to 6. For example, any one or more of $R_1$ to $R_8$ may be $C_{2-6}$ alkyl substituted with $C_{1-6}$ alkoxy, or $C_{4-6}$ alkyl substituted with $C_{1-4}$ alkoxy.

In Chemical Formula 1 and Chemical Formulae 1-1 to 1-4, the rest of $R_1$ to $R_8$ may be the same as or different from each other, and may be each independently a functional group selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl; or two or more of the substituents that are adjacent to each other may be connected with each other to form a $C_{6-20}$ aliphatic or aromatic ring unsubstituted or substituted with a $C_{1-10}$ hydrocarbyl group.

Specifically, the rest of $R_1$ to $R_8$ may be each hydrogen, or $C_{1-20}$ alkyl, or $C_{1-10}$ alkyl, or $C_{1-6}$ alkyl, or $C_{2-6}$ alkyl substituted with $C_{1-6}$ alkoxy, or $C_{4-6}$ alkyl substituted with $C_{1-4}$ alkoxy. Alternatively, two or more of $R_1$ to $R_8$ that are adjacent to each other may be connected with each other to form a $C_{6-20}$ aliphatic or aromatic ring substituted with $C_{1-3}$ hydrocarbyl group.

Preferably, in Chemical Formula 1 and Chemical Formulae 1-1 to 1-4, $R_3$ and $R_6$ may be each $C_{1-6}$ alkyl, or $C_{2-6}$ alkyl substituted with $C_{1-6}$ alkoxy, provided that one or more of $R_3$ and $R_6$ are $C_{2-6}$ alkyl substituted with $C_{1-6}$ alkoxy. Alternatively, $R_3$ and $R_6$ may be each $C_{4-6}$ alkyl, or $C_{4-6}$ alkyl substituted with $C_{1-4}$ alkoxy, provided that one or more of $R_3$ and $R_6$ are $C_{4-6}$ alkyl substituted with $C_{1-4}$ alkoxy. For example, $R_3$ and $R_6$ may be each n-butyl, n-pentyl, n-hexyl, tert-butoxy butyl, or tert-butoxy hexyl, provided that one or more of $R_3$ and $R_6$ are tert-butoxy butyl or tert-butoxy hexyl. Preferably, $R_3$ and $R_6$ may be the same as each other and may be tert-butoxy butyl or tert-butoxy hexyl.

In addition, in Chemical Formula 1 and Chemical Formulae 1-1 to 1-4, $R_1$, $R_2$, $R_4$, $R_5$, $R_7$, and $R_8$ may be hydrogen.

In Chemical Formula 1, Chemical Formula 1-2, and Chemical Formula 1-4, $Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl.

Specifically, $Q_1$ and $Q_2$ may be each $C_{1-12}$ alkyl, or $C_{1-6}$ alkyl, or $C_{1-3}$ alkyl. Preferably, $Q_1$ and $Q_2$ may be the same as each other and may be $C_{1-3}$ alkyl. More preferably, $Q_1$ and $Q_2$ may be methyl.

In Chemical Formula 1 and Chemical Formulae 1-1 to 1-4, $A_1$ may be carbon (C), silicon (Si), or germanium (Ge). Specifically, $A_1$ may be silicon (Si).

In Chemical Formula 1 and Chemical Formulae 1-1 to 1-4, $M_1$ is a Group 4 transition metal. Specifically, $M_1$ may be zirconium (Zr) or hafnium (Hf), and preferably zirconium (Zr).

In Chemical Formula 1 and Chemical Formulae 1-1 to 1-4, $X_1$ and $X_2$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group. Specifically, $X_1$ and $X_2$ may be each halogen, and may be each chloro, iodine, or bromine. Preferably, $X_1$ and $X_2$ may be chloro.

In Chemical Formula 1, m is an integer of 0 or 1, and preferably m is 0.

The compound represented by Chemical Formula 1 may be, for example, a compound represented by any one of the following structural formulae, but is not limited thereto:

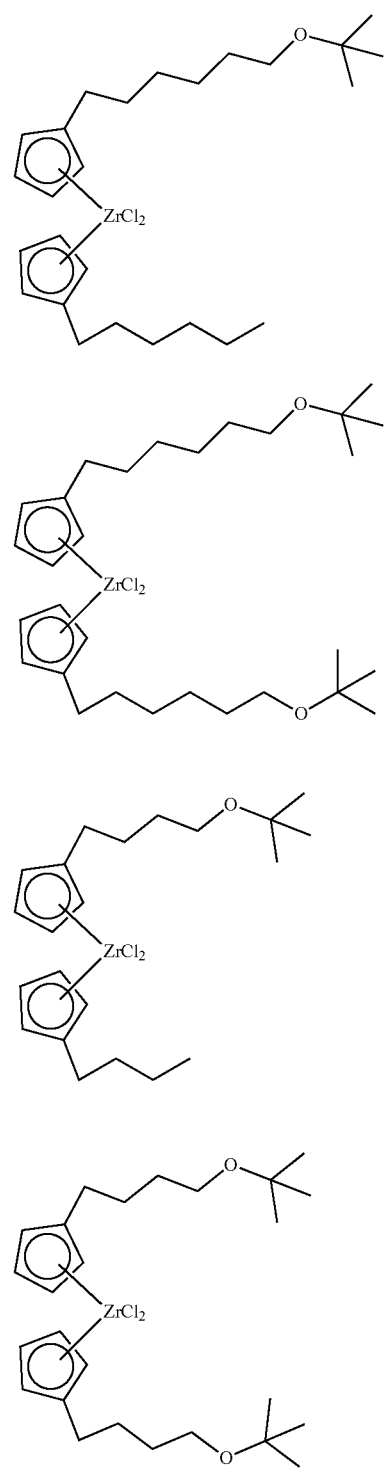

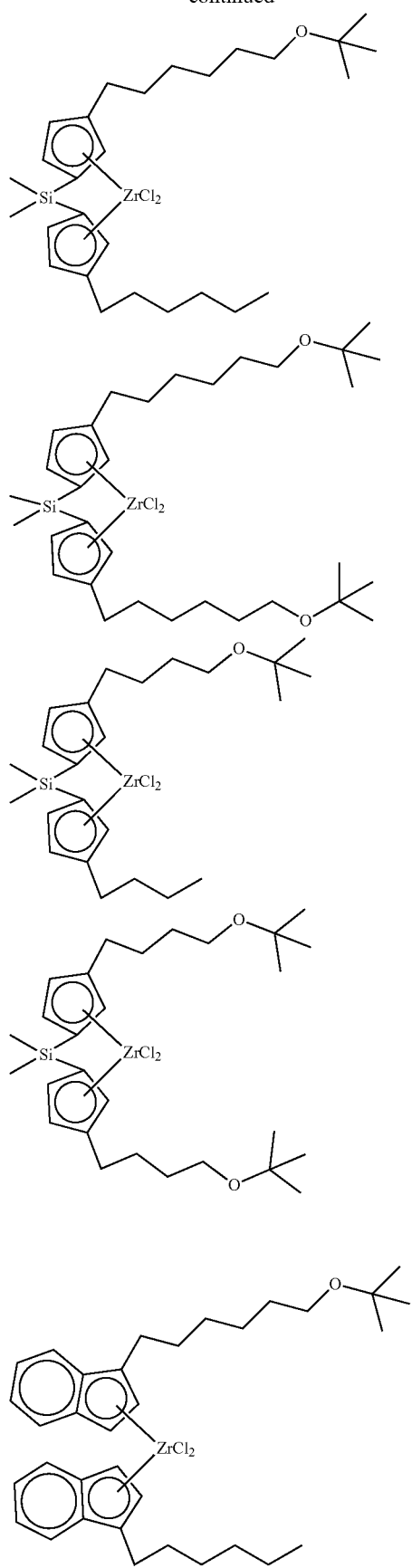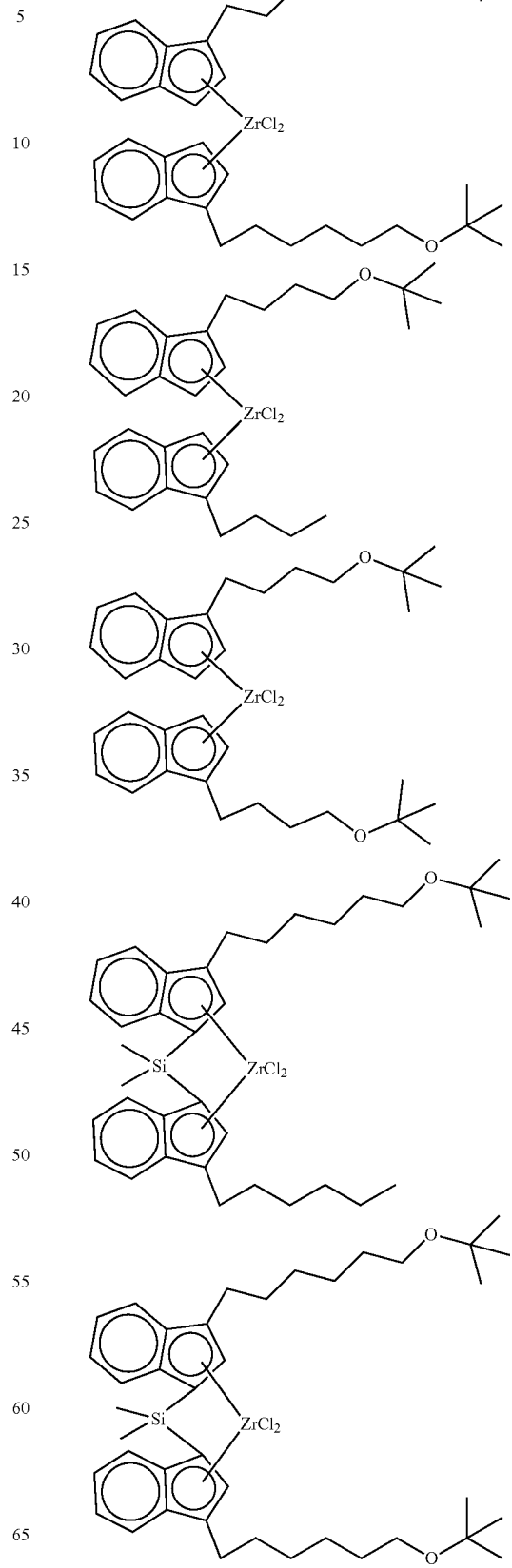

-continued

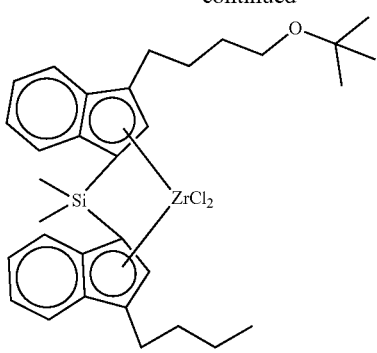

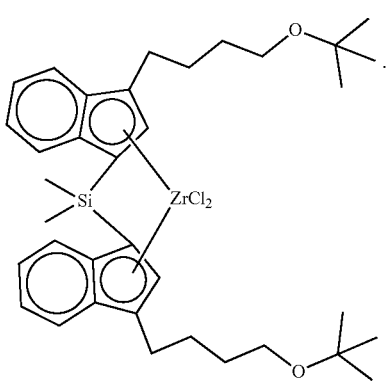

Preferably, the first metallocene compound may be a compound represented by any one of the following structural formulae:

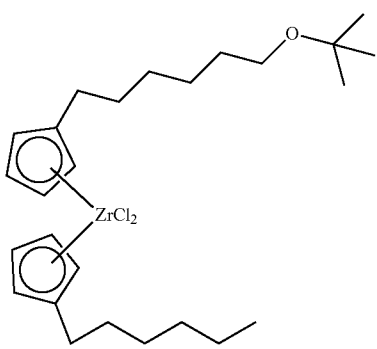

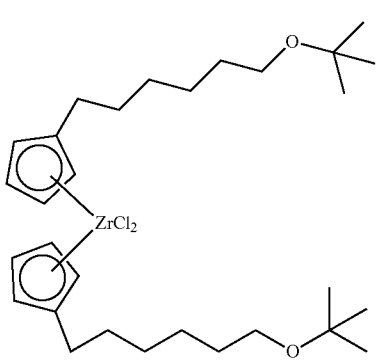

-continued

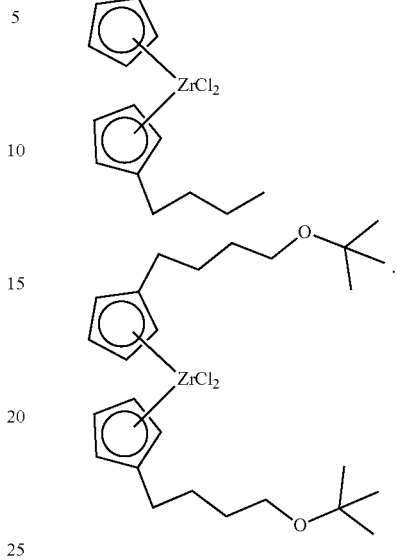

More preferably, the first metallocene compound may be a compound represented by any one of the following structural formulae:

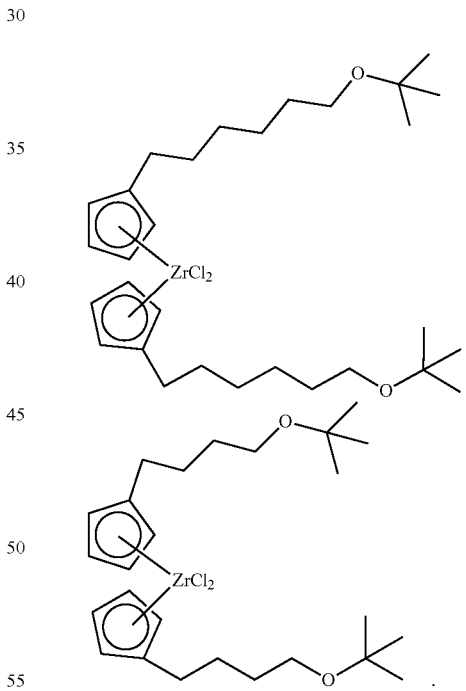

The first metallocene compound represented by the above structural formula may be synthesized by applying known reactions, and a detailed synthesis method may be referred to Examples.

In the process for preparing the polyethylene according to the present disclosure, one or more kinds of the first metallocene compound represented by Chemical Formula 1, or Chemical Formula 1-1, 1-2, 1-3, or 1-4 as described above are used together with one or more kinds of the second metallocene compound described below. Thus, it is possible to improve productivity, and tensile strength and plasticity of a CPE compound while achieving excellent extrusion processability and size stability even during high-speed extrusion in the CPE process described below by optimizing the melt index $MI_5$ and the melt flow rate ratio ($MFRR_{21.6/5}$) of polyethylene, and at the same time, by realizing a high degree of crosslinking with a narrow molecular weight distribution while a large of the high and middle molecular region with a decreased low molecular region in the molecular structure of polyethylene.

Meanwhile, the second metallocene compound may be represented by the following Chemical Formula 2-1:

[Chemical Formula 2-1]

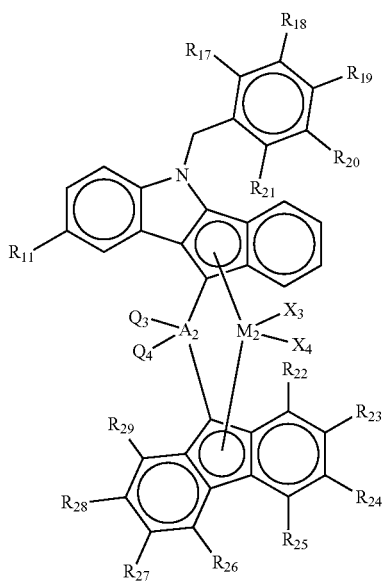

in Chemical Formula 2-1, $Q_3$, $Q_4$, $A_2$, $M_2$, $X_3$, $X_{24}$, $R_{11}$, and $R_{17}$ to $R_{29}$ are the same as defined in Chemical Formula 2.

In Chemical Formulae 2 and 2-1, $Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl. Specifically, $Q_3$ and $Q_4$ may be each $C_{1-12}$ alkyl, or $C_{1-8}$ alkyl, or $C_{1-3}$ alkyl, or $C_{2-18}$ alkoxyalkyl, or $C_{2-14}$ alkoxyalkyl, or $C_{2-12}$ alkoxyalkyl, and more specifically, $Q_3$ and $Q_4$ may be each $C_{1-3}$ alkyl or $C_{2-12}$ alkoxyalkyl. Preferably, $Q_3$ and $Q_4$ may be different from each other, and one of $Q_3$ and $Q_4$ may be $C_{1-3}$ alkyl, and the other may be $C_{2-12}$ alkoxyalkyl. More preferably, one of $Q_3$ and $Q_4$ may be methyl, and the other may be tert-butoxyhexyl.

In Chemical Formulae 2 and 2-1, $A_2$ may be carbon (C), silicon (Si), or germanium (Ge). Specifically, $A_2$ may be silicon (Si).

In Chemical Formulae 2 and 2-1, $M_2$ is a Group 4 transition metal. Specifically, $M_2$ may be zirconium (Zr) or hafnium (Hf), and preferably, zirconium (Zr).

In Chemical Formulae 2 and 2-1, $X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group. Specifically, $X_3$ and $X_4$ may be each halogen, and may be each chloro, iodine, or bromine. Preferably, $X_3$ and $X_4$ may be chloro.

In Chemical Formula 2, one of $C_1$ and $C_2$ may be represented by Chemical Formula 3a or Chemical Formula 3b, and the other of $C_1$ and $C_2$ may be represented by Chemical Formula 3c, Chemical Formula 3d, or Chemical Formula 3e, and preferably, represented by Chemical Formula 3c.

In Chemical Formulae 2 and 2-1, $R_9$ to $R_{21}$ and $R_{9'}$ to $R_{21'}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that one or more of $R_{17}$ to $R_{21}$ or one or more of $R_{17'}$ to $R_{21'}$ are $C_{1-20}$ haloalkyl.

Specifically, in Chemical Formula 2, $R_9$ to $R_{10}$ and $R_{12}$ to $R_{16}$ and $R_{9'}$ to $R_{10'}$ and $R_{12'}$ to $R_{16'}$ may be hydrogen.

In Chemical Formulae 2 and 2-1, $R_{11}$ and $R_{11'}$ may be each $C_{1-6}$ linear or branched alkyl, or $C_{1-3}$ linear or branched alkyl, and preferably, may be methyl.

Specifically, in Chemical Formulae 2 and 2-1, $R_{17}$ to $R_{21}$ or $R_{17'}$ to $R_{21'}$ may be each hydrogen or $C_{1-6}$ haloalkyl, provided that one or more of $R_{17}$ to $R_{21}$ or one or more of $R_{17'}$ to $R_{21'}$ are $C_{1-6}$ haloalkyl. Alternatively, $R_{17}$ to $R_{21}$ or $R_{17'}$ to $R_{21'}$ may be each hydrogen or $C_{1-3}$ haloalkyl, provided that one or more of $R_{17}$ to $R_{21}$ or one or more of $R_{17'}$ to $R_{21'}$ are $C_{1-3}$ haloalkyl. For example, $R_{17}$ to $R_{20}$ or $R_{17'}$ to $R_{20'}$ are hydrogen, and $R_{21}$ or $R_{21'}$ is trihalomethyl, and preferably, trifluoromethyl.

In Chemical Formulae 2 and 2-1, $R_{22}$ to $R_{39}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, or two or more of $R_{22}$ to $R_{39}$ that are adjacent to each other may be connected with each other to form a $C_{6-20}$ aliphatic or aromatic ring unsubstituted or substituted with a $C_{1-10}$ hydrocarbyl group.

Specifically, $R_{22}$ to $R_{29}$ may be each hydrogen, or $C_{1-20}$ alkyl, or $C_{1-10}$ alkyl, or $C_{1-6}$ alkyl, or $C_{1-3}$ alkyl. Alternatively, two or more of $R_{22}$ to $R_{29}$ that are adjacent to each other may be connected with each other to form a $C_{6-20}$ aliphatic or aromatic ring substituted with $C_{1-3}$ hydrocarbyl group. Preferably, $R_{22}$ to $R_{29}$ may be hydrogen.

Specifically, in Chemical Formulae 2 and 2-1, $R_{30}$ to $R_{35}$ may be each hydrogen, or $C_{1-20}$ alkyl, or $C_{1-10}$ alkyl, or $C_{1-6}$ alkyl, or $C_{1-3}$ alkyl.

In Chemical Formulae 2 and 2-1, $R_{26}$ to $R_{29}$ may be each hydrogen, or $C_{1-20}$ alkyl, or $C_{1-10}$ alkyl, or $C_{1-6}$ alkyl, or $C_{1-3}$ alkyl.

The compound represented by Chemical Formula 2 may be, for example, a compound represented by the following structural formula, but is not limited thereto:

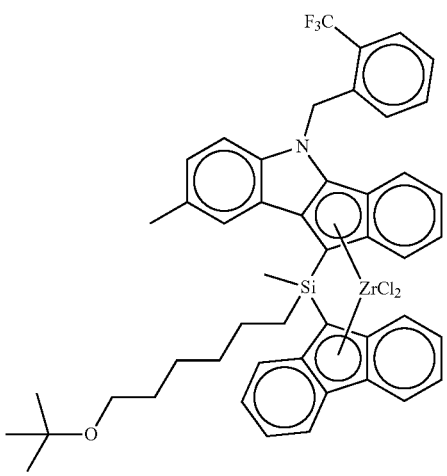

The second metallocene compound represented by the above structural formula may be synthesized by applying known reactions, and a detailed synthesis method may be referred to Examples.

A process for preparing the metallocene compound is described in detail in Examples to be described later.

The metallocene catalyst used in the present disclosure may be supported on a support together with a cocatalyst compound.

In the supported metallocene catalyst according to the present disclosure, the cocatalyst supported on a support for activating the metallocene compound is an organometallic compound containing a Group 13 metal, and is not particularly limited as long as it may be used in the polymerization of olefins in the presence of a general metallocene catalyst.

The cocatalyst is an organometallic compound containing a Group 13 metal, and is not particularly limited as long as it may be used in the polymerization of ethylene in the presence of a general metallocene catalyst.

Specifically, the cocatalyst may be one or more selected from the group consisting of compounds represented by the following Chemical Formulae 4 to 6:

$$-[Al(R_{40})-O]_c-$$ [Chemical Formula 4]

in Chemical Formula 4,
$R_{40}$ is each independently halogen, $C_{1-20}$ alkyl, or $C_{1-20}$ haloalkyl,
c is an integer of 2 or more, $$D(R_{41})_3$$ [Chemical Formula 5]

in Chemical Formula 5,
D is aluminum or boron, and
$R_{41}$'s are each independently hydrogen, halogen, $C_{1-20}$ hydrocarbyl or $C_{1-20}$ hydrocarbyl substituted with halogen, $$[L-H]^+[Q(E)_4]^- \text{ or } [L]^+[Q(E)_4]^-$$ [Chemical Formula 6]

in Chemical Formula 6,
L is a neutral or cationic Lewis base,
$[L-H]^+$ is a bronsted acid,
Q is $B^{3+}$ or $Al^{3+}$, and
E's are each independently $C_{6-20}$ aryl or $C_{1-20}$ alkyl, wherein $C_{6-20}$ aryl or $C_{1-20}$ alkyl is substituted or unsubstituted with one or more substituents selected from the group consisting of halogen, $C_{1-20}$ alkyl, $C_{1-20}$ alkoxy, and phenoxy.

The compound represented by Chemical Formula 4 may be, for example, alkylaluminoxane such as modified methyl aluminoxane (MMAO), methyl aluminoxane (MAO), ethylaluminoxane, isobutylaluminoxane, or butylaluminoxane, and the like The alkyl metal compound represented by Chemical Formula 5 may be, for example, trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-t-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, or tributylboron, and the like The compound represented by Chemical Formula 6 may be, for example, triethylammoniumtetraphenylboron, tributylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenyl boron, N,N-dimethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-dimethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, triphenylcarboniumtetraphenylboron, triphenylcarboniumtetraphenylaluminum, triphenylcarboniumtetra(p-trifluoromethylphenyl)boron, or triphenylcarboniumtetrapentafluorophenylboron, and the like The cocatalyst may be supported in an amount of about 5 mmol to about 20 mmol, based on 1 g of the support.

In the supported metallocene catalyst according to the present disclosure, a support containing hydroxyl groups on the surface may be used as the support. Preferably, a support containing highly reactive hydroxyl groups and siloxane groups which is dried to remove moisture on the surface may be used.

For example, silica, silica-alumina, or silica-magnesia dried at a high temperature may be used, and may commonly include oxide, carbonate, sulfate, and nitrate, such as $Na_2O$, $K_2CO_3$, $BaSO_4$, or $Mg(NO_3)_2$, and the like A drying temperature of the support may be preferably about 200° C. to about 800° C., more preferably about 300° C. to about 600° C., and most preferably, about 300° C. to about 400° C. When the drying temperature of the support is lower than about 200° C., surface moisture may react with the cocatalyst due to excessive moisture. When it is higher than about 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may be preferably about 0.1 mmol/g to about 10 mmol/g, and more preferably about 0.5 mmol/g to about 5 mmol/g. The amount of the hydroxyl groups on the surface of the support may be controlled by the preparation method and conditions of the support, or drying conditions, for example, temperature, time, vacuum, or spray drying, and the like When the amount of the hydroxyl groups is less than about 0.1 mmol/g, the reaction sites with the cocatalyst may be little, and when it is more than about 10 mmol/g, there is a possibility of being derived from moisture other than hydroxyl groups on the surface of the support particle, which is not preferable.

In the supported metallocene catalyst of the present disclosure, a weight ratio of the total transition metal included in the metallocene catalyst to the support may be about 1:10 to 1:1000. When the support and the metallocene compounds are included within the above weight ratio, an optimal shape may be exhibited. In addition, a weight ratio of the cocatalyst compound to the support may be about 1:1 to 1:100.

The ethylene polymerization reaction may be carried out using a single continuous slurry polymerization reactor, loop slurry reactor, gas phase reactor, or solution reactor.

In particular, the polyethylene according to the present disclosure may be prepared by homopolymerizing ethylene in the presence one or more kinds of the first metallocene compound represented by Chemical Formula 1; and one or more kinds of the second metallocene compound selected from the compounds represented by Chemical Formula 2.

The molar ratio of the first metallocene compound and the second metallocene compound may be within such a range, with a purpose of increasing the content of medium or high molecular ranges and minimizing the content of the low molecular range in the molecular structure of the polyethylene, along with a narrow molecular weight distribution, to produce a chlorinated polyethylene in excellent chlorination productivity and extrusion processability along with the improved mechanical properties.

Specifically, the molar ratio of the first metallocene compound and the second metallocene compound (first metallocene compound:second metallocene compound) may be about 3:1 to about 7:1, specifically, about 3.5:1 to about 6.5:1, or about 4:1 to about 6:1, or about 4.5:1 to about 5.5:1.

Meanwhile, a weight ratio of the first metallocene compound and the second metallocene compound may be, for example, about 40:60 to about 45:55. Specifically, the weight ratio of the first and second metallocene compounds may be about 41:59 to about 44:56, or about 42:58 to about 43:57. The weight ratio of the catalyst precursor may be within the above range in terms of optimizing a large of the medium or high molecular region in a molecular structure in order to prepare a chlorinated polyethylene and a CPE compound having high extrusion processability and excellent size stability even during high-speed extrusion in a process of manufacturing electric wires or cables, and the like.

Further, in the present disclosure, the polyethylene may be prepared under the metallocene catalyst as described above while introducing hydrogen gas. Here, the hydrogen gas may be used by adjusting in the contents, so that the polyethylene obtained after polymerization has an optimized range of the low molecular region in the molecular structure along with a narrow molecular weight distribution.

In this regard, the hydrogen gas may be introduced in an amount of about 0.5 ppm to about 50 ppm, or about 0.7 ppm or more, or about 1.5 ppm or more, or about 5 ppm or more, or about 8 ppm or more, or about 10 ppm or more, or about 12 ppm or more, or about 15 ppm or more. At the same time, the hydrogen gas may be introduced in an amount of about 48 ppm or less, or about 45 ppm or less, or about 42 ppm or less, or about 40 ppm or less, or about 38 ppm or less, or about 35 ppm or less, or about 32 ppm or less, or about 30 ppm or less, or about 28 ppm or less, or about 25 ppm or less, or about 22 ppm or less, or about 20 ppm or less. The input amount of hydrogen gas may be maintained within the above range, in terms of maintaining the optimal range of the melt index and the molecular weight distribution of the polyethylene obtained after polymerization while minimizing the low molecular region in the molecule. In particular, when the hydrogen gas is introduced in an amount of more than 50 ppm, a wax content in a polymerization reaction solvent, e.g., hexane is increased. Thus, there may be a problem in that a particle aggregation phenomenon may occur during the chlorination reaction. Further, the wax content may be maintained at 20% or less in the polymerization process of the present disclosure, and the hydrogen input may be controlled. The wax content may be measured by separating the polymerization product using a centrifugal separator, sampling 100 mL of the remaining hexane solvent, settling for 2 hours, and determining a volume ratio occupied by the wax.

Further, the polymerization temperature may be about 25° C. to about 500° C., preferably about 25° C. to about 200° C., and more preferably about 50° C. to about 150° C. Further, the polymerization pressure may be about 1 kgf/cm$^2$ to about 100 kgf/cm$^2$, preferably about 1 kgf/cm$^2$ to about 50 kgf/cm$^2$, and more preferably about 5 kgf/cm$^2$ to about 30 kgf/cm$^2$.

The supported metallocene catalyst may be injected after being dissolved or diluted in a $C_5$ to $C_{12}$ aliphatic hydrocarbon solvent, such as pentane, hexane, heptane, nonane, decane and an isomer thereof, or in an aromatic hydrocarbon solvent, such as toluene and benzene, or in a hydrocarbon solvent substituted with chlorine, such as dichloromethane and chlorobenzene. The solvent used herein is preferably used after removing a small amount of water or air, which acts as a catalyst poison, by treating with a small amount of alkyl aluminum. It is also possible to further use the cocatalyst.

In the present disclosure, the equivalent (eq) refers to a molar equivalent (eq/mol).

Meanwhile, according to still another embodiment of the present disclosure, provided is a chlorinated polyethylene (CPE) prepared using the above-described polyethylene.

The chlorinated polyethylene according to the present disclosure may be prepared by polymerizing ethylene in the presence of the supported metallocene catalyst described above, and then reacting the polyethylene with chlorine.

The reaction with chlorine may be carried out by dispersing the prepared polyethylene with water, an emulsifier and a dispersant, and then adding a catalyst and chlorine thereto.

The emulsifier may be polyether or polyalkylene oxide. The dispersant may be a polymer salt or an organic acid polymer salt, and the organic acid may be methacrylic acid or acrylic acid.

The catalyst may be a chlorination catalyst used in the art, and for example, benzoyl peroxide may be used. The chlorine may be used alone, or may be used in a mixture with an inert gas.

The chlorination reaction may be preferably performed at about 60° C. to about 150° C., or about 70° C. to about 145° C., or about 80° C. to about 140° C. and the reaction time may be preferably about 10 minutes to about 10 hours, about 1 hour to about 9 hours, or about 2 hours to about 8 hours.

The chlorinated polyethylene prepared by the above reaction may be further subjected to a neutralization process, a washing process, and/or a drying process, and thus may be obtained in a powder form.

Meanwhile, the chlorinated polyethylene exhibits excellent chlorine distribution uniformity in the chlorinated polyethylene due to the narrow molecular weight distribution of polyethylene. Accordingly, the chlorinated polyethylene can secure high tensile strength with excellent processability when processing a CPE compound for use in electric wires and cables.

For example, the chlorinated polyethylene may have a chlorine content of about 20% by weight to about 50% by weight, about 31% by weight to about 45% by weight, or about 35% by weight to about 40% by weight. Here, the chlorine content of the chlorinated polyethylene may be measured using combustion ion chromatography (Combustion IC, Ion Chromatography). For example, the combustion ion chromatography uses a combustion IC (ICS-5000/AQF-2100H) device equipped with an IonPac AS18 (4×250 mm) column. The chlorine content may be measured using KOH (30.5 mM) as an eluent at a flow rate of 1 mL/min at an inlet temperature of 900° C. and an outlet temperature of 1000° C. The device conditions and measurement conditions for measuring the chlorine content are in line with a conventional method in the art, the detailed description is omitted herein.

Specifically, the chlorinated polyethylene according to the present disclosure may have a Mooney viscosity (MV) of about 65 to about 80, a tensile strength of about 12.5 MPa or more or about 12.5 MPa to about 15 MPa, and a tensile elongation of about 900% or more or about 900% to about 1200% under a condition where the chlorine content is 35% by weight to 40% by weight.

The chlorinated polyethylene may be, for example, a randomly chlorinated polyethylene.

The chlorinated polyethylene prepared according to the present disclosure is excellent in chemical resistance, weather resistance, flame retardancy, or processability, and the like, and is widely applied to electric wires or cables, and the like.

Meanwhile, according to still another embodiment of the present disclosure, provided is a chlorinated polyethylene (CPE) compound including the above-described chlorinated polyethylene.

In particular, the chlorinated polyethylene (CPE) compound of the present disclosure is characterized by minimizing deterioration of processability during extrusion and exhibiting excellent mechanical properties, because the polyethylene has a molecular structure having a low ratio of a low molecular region while having a high ratio of medium/high molecular regions in the molecular structure and achieves a high degree of crosslinking with a narrow molecular weight distribution of the polyethylene.

The chlorinated polyethylene (CPE) compound is mainly applied to electric wires and cables, and has excellent characteristics in processability, surface appearance and gloss of a molded article, and tensile strength for crosslinked compound.

The chlorinated polyethylene (CPE) compound may include about 1% by weight to about 80% by weight, about 10% by weight to about 70% by weight, about 20% by weight to about 60% by weight of the chlorinated polyethylene prepared by the method as described above.

For example, the chlorinated polyethylene (CPE) compound may include 100 parts by weight to 280 parts by weight of an inorganic additive such as talc and carbon black and 1 part by weight to 40 parts by weight of a crosslinking agent, based on 100 parts by weight of the chlorinated polyethylene.

For a specific example, the chlorinated polyethylene (CPE) compound may include 25% by weight to 50% by weight of the chlorinated polyethylene, 50% by weight to 70% by weight of an inorganic additive such as talc and carbon black, and 0.5% by weight to 10% by weight of a crosslinking agent.

The chlorinated polyethylene(CPE) compound according to the present disclosure may have a tensile strength of about 12.8 MPa or more or about 12.8 MPa to about 25 MPa, as measured in accordance with the ASTM D 412 method under a condition of 500 mm/min. Further, the chlorinated polyethylene (CPE) compound may have a tensile strength of about 13 MPa or more, or about 13.2 MPa or more, or about 13.5 MPa or more, or about 13.7 MPa or more, or about 13.9 MPa or more, or about 14 MPa or more, in terms of securing excellent mechanical properties when applied to electric wires or cables, and the like. However, the chlorinated polyethylene (CPE) compound may have a tensile strength of about 24.5 MPa or less, or about 24 MPa or less, or about 23.5 MPa or less, or about 23 MPa or less, or about 22.5 MPa or less, or about 22 MPa or less, or about 20 MPa or less, or about 18 MPa or less, or about 16 MPa or less, or about 15.5 MPa or less, or about 15 MPa or less, or about 14.5 MPa or less, in terms of securing excellent extrusion processability and size stability even in a high-speed extrusion process when applied to electric wires, or cables, and the like, and exhibiting the above-described excellent mechanical properties.

In addition, a method of manufacturing a molded article using the chlorinated polyethylene according to the present disclosure may be performed by applying a traditional method in the art. For example, the molded article may be manufactured by roll-mill compounding the chlorinated polyethylene and extruding it.

Hereinafter, preferred examples will be provided for better understanding of the present invention. However, the following examples are provided only for understanding the present invention more easily, but the content of the present invention is not limited thereby.

EXAMPLE

[Preparation of Catalyst Precursor]

Synthesis Example 1: Preparation of First Metallocene Compound

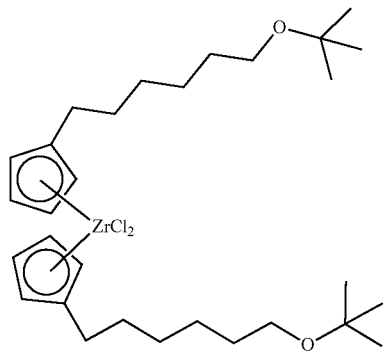

t-butyl-O—(CH$_2$)$_6$—Cl was prepared by a method described in a literature (Tetrahedron Lett. 2951(1988)) using 6-chlorohexanol, and reacted with cyclopentadienyl sodium (NaCp) to obtain t-butyl-O—(CH$_2$)$_6$—C$_5$H$_5$ (yield 60%, b.p. 80° C./0.1 mmHg).

Further, t-butyl-O—(CH$_2$)$_6$—C$_5$H$_5$ was dissolved in tetrahydrofuran (THF) at −78° C., and n-butyllithium (n-BuLi) was slowly added thereto. Thereafter, the mixture was heated to room temperature and allowed to react for 8 hours. The lithium salt solution synthesized as described above was slowly added to a suspension solution of ZrCl$_4$(THF)$_2$ (170 g, 4.50 mmol)/THF (30 mL) at −78° C., and further reacted for 6 hours at room temperature. All volatiles were removed by drying under vacuum and the resulting oily liquid material was filtered by adding hexane. The filtered solution was dried under vacuum, and hexane was added to obtain a precipitate at a low temperature (−20° C.). The obtained precipitate was filtered at a low temperature to obtain [t-butyl-O—(CH$_2$)$_6$—C$_5$H$_4$]2ZrCl$_2$] in the form of a white solid (yield 92%).

$^1$H-NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C-NMR (CDCl$_3$): 135.09, 116.66, 112.28, 72.42, 61.52, 30.66, 30.31, 30.14, 29.18, 27.58, 26.00.

Synthesis Example 2: Preparation of Second Metallocene Compound

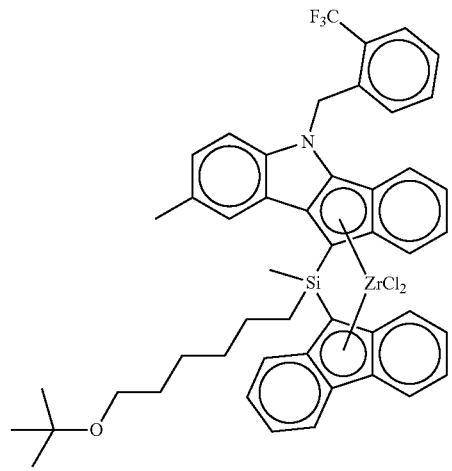

2-1 Preparation of Ligand Compound 2.9 g (7.4 mmol) of 8-methyl-5-(2-(trifluoromethyl)benzyl)-5,10-dihydroindeno[1,2-b]indole was dissolved in 100 mL of hexane and 2 mL (16.8 mmol) of methyl tertiary butyl ether (MTBE), and 3.2 mL (8.1 mmol) of 2.5 M n-butyllithium (n-BuLi) hexane solution was added dropwise in a dry ice/acetone bath and stirred at room temperature overnight. In another 250 mL schlenk flask, 2 g (7.4 mmol) of (6-tert-butoxyhexyl)dichloro(methyl)silane was dissolved in 50 mL of hexane and added dropwise in a dry ice/acetone bath. Then, a lithiated slurry of 8-methyl-5-(2-(trifluoromethyl)benzyl)-5,10-dihydroindeno[1,2-b]indole was added dropwise through a cannula. After the injection, the mixture was slowly heated to room temperature and then stirred at room temperature overnight. At the same time, 1.2 g (7.4 mmol) of fluorene was also dissolved in 100 mL of tetrahydrofuran (THF), and 3.2 mL (8.1 mmol) of 2.5 M n-BuLi hexane solution was added dropwise in a dry ice/acetone bath, followed by stirring at room temperature overnight.

The reaction solution (Si solution) of 8-methyl-5-(2-(trifluoromethyl)benzyl)-5,10-dihydroindeno[1,2-b]indole and (6-(tert-butoxy)hexyl)dichloro(methyl)silane was confirmed by NMR sampling.

$^1$H NMR (500 MHz, CDCl$_3$): 7.74-6.49 (11H, m), 5.87 (2H, s), 4.05 (1H, d), 3.32 (2H, m), 3.49 (3H, s), 1.50-1.25 (8H, m), 1.15 (9H, s), 0.50 (2H, m), 0.17 (3H, d).

After confirming the synthesis, the lithiated solution of fluorene was slowly added dropwise to the Si solution in a dry ice/acetone bath, and stirred at room temperature overnight. After the reaction, it was extracted with ether/water and residual moisture of the organic layer was removed with MgSO$_4$. Then, the solvent was removed under vacuum reduced pressure to obtain 5.5 g (7.4 mmol) of an oily ligand compound, which was confirmed by $^1$H-NMR.

$^1$H NMR (500 MHz, CDCl$_3$): 7.89-6.53 (19H, m), 5.82 (2H, s), 4.26 (1H, d), 4.14-4.10 (1H, m), 3.19 (3H, s), 2.40 (3H, m), 1.35-1.21 (6H, m), 1.14 (9H, s), 0.97-0.9 (4H, m), −0.34 (3H, t).

2-2 Preparation of Metallocene Compound 5.4 g (Mw 742.00, 7.4 mmol) of the ligand compound synthesized in 2-1 was dissolved in 80 mL of toluene and 3 mL (25.2 mmol) of MTBE, and 7.1 mL (17.8 mmol) of 2.5 M n-BuLi hexane solution was added dropwise in a dry ice/acetone bath, followed by stirring at room temperature overnight. 3.0 g (8.0 mmol) of $ZrCl_4(THF)_2$ was added to 80 mL of toluene to prepare a slurry. 80 mL of the toluene slurry of $ZrCl_4(THF)_2$ was transferred to a ligand-Li solution in a dry ice/acetone bath and stirred at room temperature overnight.

After the reaction mixture was filtered to remove LiCl, the toluene of the filtrate was removed by drying under vacuum, and then 100 mL of hexane was added thereto, followed by sonication for 1 hour. This was filtered to obtain 3.5 g (yield 52 mol %) of a purple metallocene compound as a filtered solid.

$^1$H NMR (500 MHz, $CDCl_3$): 7.90-6.69 (9H, m), 5.67 (2H, s), 3.37 (2H, m), 2.56 (3H, s), 2.13-1.51 (11H, m), 1.17 (9H, s).

Synthesis Example 3: Preparation of Second Metallocene Compound

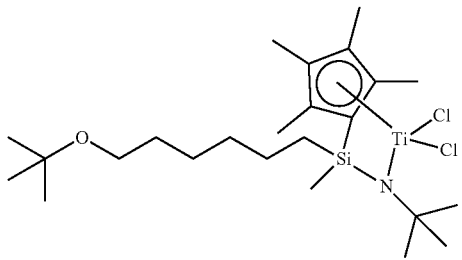

50 g of Mg (s) was added to a 10 L reactor at room temperature, followed by adding 300 mL of THF. 0.5 g of $I_2$ was added, and the reactor temperature was maintained at 50° C. After the reactor temperature was stabilized, 250 g of 6-t-butoxyhexyl chloride was added to the reactor at a rate of 5 mL/min using a feeding pump. It was observed that the reactor temperature was increased by 4° C. to 5° C. with the addition of 6-t-butoxyhexylchloride. It was stirred for 12 hours while continuously adding 6-t-butoxyhexylchloride to obtain a black reaction solution. 2 mL of the black solution was taken to which water was added to obtain an organic layer. The organic layer was confirmed to be 6-t-butoxyhexane through $^1$HNMR, indicating that Grignard reaction occurred well. Consequently, 6-t-butoxyhexyl magnesium chloride was synthesized.

500 g of $MeSiCl_3$ and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. Then, it was confirmed that white $MgCl_2$ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be methyl(6-t-butoxyhexyl)dichlorosilane through $^1$H-NMR.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to the reactor, and then the reactor temperature was cooled down to −20° C. 480 mL of n-BuLi was added to the reactor at a rate of 5 ml/min using a feeding pump. After n-BuLi was added, the mixture was stirred for 12 hours while slowly raising the reactor temperature to room temperature. Then, an equivalent of methyl(6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-$BuNH_2$ was added. The mixture was stirred for 12 hours while slowly raising the reactor temperature to room temperature. Then, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl (6-t-butoxyhexyl)(tetramethylCpH)t-butylaminosilane through $^1$H-NMR.

$TiCl_3(THF)_3$ (10 mmol) was rapidly added to a dilithium salt of a ligand at −78° C., which was synthesized from n-BuLi and the ligand of dimethyl(tetramethylCpH)t-butylaminosilane in THF solution. While slowly heating the reaction solution from −78° C. to room temperature, it was stirred for 12 hours. Then, an equivalent of $PbCl_2$ (10 mmol) was added to the reaction solution at room temperature, and then stirred for 12 hours to obtain a dark black solution having a blue color. After removing THF from the resulting reaction solution, hexane was added to filter the product. Hexane was removed from the filtered solution, and then the product was confirmed to be [tBu-O—$(CH_2)_6$]$(CH_3)Si(C_5(CH_3)_4)$(tBu-N)$TiCl_2$] through $^1$H-NMR.

$^1$H-NMR ($CDCl_3$): 3.3 (s, 4H), 2.2 (s, 6H), 2.1 (s, 6H), 1.8-0.8 (m), 1.4 (s, 9H), 1.2 (s, 9H), 0.7 (s, 3H).

[Preparation of Supported Catalyst]

Preparation Example 1: Preparation of Supported Catalyst 5.0 kg of a toluene solution was put in a 20 L stainless steel (sus) high-pressure reactor, and the reactor temperature was maintained at 40° C. 1000 g of silica (SP948, manufactured by Grace Davison Co.) dehydrated at a temperature of 600° C. for 12 hours under vacuum was added to the reactor, and the silica was sufficiently dispersed, and then 84 g of the first metallocene compound of Synthesis Example 1 dissolved in toluene was added thereto and then allowed to react under stirring at 200 rpm at 40° C. for 2 hours. Thereafter, the stirring was stopped, followed by settling for 30 minutes and decantation of the reaction solution.

2.5 kg of toluene was added to the reactor, and 9.4 kg of 10 wt % methylaluminoxane (MAO)/toluene solution was added thereto, followed by stirring at 200 rpm at 40° C. for 12 hours. After the reaction, the stirring was stopped, followed by settling for 30 minutes and decantation of the reaction solution. 3.0 kg of toluene was added and stirred for 10 minutes, and then the stirring was stopped, followed by settling for 30 minutes and decantation of the toluene solution.

3.0 kg of toluene was added to the reactor, 116 g of the second metallocene compound of Synthesis Example 2 dissolved in 1 L of a toluene solution was added thereto, and allowed to react under stirring at 200 rpm at 40° C. for 2 hours. After lowering the reactor temperature to room temperature, the stirring was stopped, followed by settling for 30 minutes and decantation of the reaction solution. At this time, the first metallocene compound of Chemical Formula A and the second metallocene compound of Chemical Formula B were used at a molar ratio of 5:1.

2.0 kg of toluene was added to the reactor and stirred for 10 minutes. Then, the stirring was stopped, followed by settling for 30 minutes and decantation of the reaction solution.

3.0 kg of hexane was added to the reactor, a hexane slurry was transferred to a filter drier, and the hexane solution was filtered. 1 kg-SiO$_2$ supported hybrid catalyst was prepared by drying under reduced pressure at 40° C. for 4 hours.

Comparative Preparation Example 1: Preparation of Supported Catalyst

A supported hybrid catalyst was prepared in the same manner as in Preparation Example 1, except that the metallocene compound of Synthesis Example 3 was used instead of the metallocene compound of Synthesis Example 2.

[Preparation of Polyethylene]

Example 1

The supported catalyst prepared in Preparation Example 1 was added to a single slurry polymerization process to prepare a high-density polyethylene.

First, a reactor with a capacity of 100 m$^3$ was charged with a flow rate of 25 ton/hr of hexane, 10 ton/hr of ethylene, and 10 kg/hr of triethylaluminum (TEAL), and the supported hybrid metallocene catalyst of Preparation Example 1 was injected to the reactor at 0.5 kg/hr. The polymerization process was performed under a condition of injecting 30 L/hr of hydrogen, and the hydrogen input amount was 15 ppm, based on the content of ethylene. Thereafter, the ethylene was continuously reacted in a hexane slurry state at a reactor temperature of 82° C. and a pressure of 7.0 kg/cm$^2$ to 7.5 kg/cm$^2$. Then, solvent removal and drying processes were performed to prepare a high-density polyethylene in a powder form.

Example 2

A high-density polyethylene of Example 2 was prepared in a powder form by performing a polymerization process in the same manner as in Example 1, except that the input amount of hydrogen was changed to 40 L/hr. At this time, the hydrogen input amount was 20 ppm, based on the content of ethylene.

Comparative Example 1

A high-density polyethylene (HDPE) commercial product (product name: CE2080, manufactured by LG Chem), which was prepared using a Ziegler-Natta catalyst (Z/N), was prepared for Comparative Example 1.

Comparative Example 2

A high-density polyethylene (HDPE) commercial product (product name: SC200H, manufactured by LG Chem), which was prepared using a metallocene catalyst, was prepared for Comparative Example 2.

Comparative Example 3

A high-density polyethylene (HDPE) commercial product (product name: 5010CP, manufactured by Lotte Chem), which was prepared using a Ziegler-Natta catalyst, was prepared for Comparative Example 3.

Comparative Example 4

A high-density polyethylene (HDPE) commercial product (product name: SC100E, manufactured by LG Chem), which was prepared using a metallocene catalyst, was prepared for Comparative Example 4.

Comparative Example 5

A high-density polyethylene was prepared in a powder form in the same manner as in Example 1, except that the supported catalyst prepared in Comparative Preparation Example 1 was used.

Experimental Example

Test Example 1

Physical properties of the polyethylenes of Examples 1 to 2 and Comparative Examples 1 to 5 were measured by the following methods, and the results are shown in Table 1 below.

1) Density:

The density (g/cm$^3$) of each polyethylene was measured in accordance with the ASTM D 1505 method.

2) Melt Index (MI, g/10 Min):

The melt index (MI$_5$) was measured in accordance with the ASTM D 1238 method at a temperature of 190° C. under a load of 5 kg. A weight (g) of the polymer melted for 10 minutes was recorded as the melt index.

3) Complex Viscosity for Polyethylene (Pas, 500 Rad/s):

The complex viscosity for each polyethylene of Examples 1 to 2 and Comparative Examples 1 to 5 was measured using a rotary rheometer (ARES Rheometer) at 190° C. and a frequency ($\omega$) of 0.05 rad/s to 500 rad/s.

In particular, the complex viscosity of each polyethylene was determined by measuring complex viscosity $\eta^*(\omega 0.05)$ and $\eta^*(\omega 500)$ according to frequency using a rotary rheometer ARES (Advanced Rheometric Expansion System, ARES G2) of TA instruments (New Castle, Delaware). A predetermined amount of the polyethylene sample was injected into ARES-G2 instrument and 25 mm parallel plates and ring, and the gap between parallel plates with a diameter of 25.0 mm became 2.0 mm by pressing upper and lower fixture at 190° C. Measurements were conducted in a dynamic strain frequency sweep mode and at a strain rate of 5% and a frequency (angular frequency) of 0.05 rad/s to 500 rad/s. 10 points for each decade, a total of 41 points, were measured. Among them, the complex viscosity measured at a frequency ($\omega$) of 500 rad/s was shown in Table 1 below.

4) Molecular Weight Distribution (Mw/Mn, Polydispersity Index) and Log MW (4.0 or Less and 4.5 or Less) Ratio:

The molecular weight distribution (Mw/Mn) was determined by measuring a weight average molecular weight (Mw) and a number average molecular weight (Mn) of the polyethylene using gel permeation chromatography (GPC, manufactured by Water), and then dividing the weight average molecular weight by the number average molecular weight.

In particular, Waters PL-GPC220 was used as the gel permeation chromatography (GPC) instrument, and a Polymer Laboratories PLgel MIX-B 300 mm length column was used. In this regard, the measurement temperature was 160° C., and 1,2,4-trichlorobenzene was used as a solvent, and a flow rate of 1 mL/min was applied. The polyethylene samples according to Examples and Comparative Examples were pretreated by dissolving in 1,2,4-trichlorobenzene containing 0.0125% of BHT at 160° C. for 10 hours using a GPC analyzer (PL-GP220), and each sample was prepared at a concentration of 10 mg/10 mL, and then was supplied in an amount of 200 μL. Mw and Mn values were obtained using a calibration curve formed using polystyrene standards. 9 kinds of polystyrene standards were used, the polystyrene standards having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

Further, a ratio (%) of an integral value of the region, where log Mw is 4.0 or less, or an integral value of the region, where log Mw is 4.5 or less, to a total integral value of a log graph with respect to the weight average molecular weight (Mw) of the polyethylene thus measured, which is a GPC curve graph having the x-axis of log Mw and the y-axis of dw/d log Mw, was calculated and shown in Table 1 below.

5) Elongational Viscosity (210° C., 0.5 s, ×1000 Pa·s) for Crosslinked Polyethylene:

The crosslinked PE elongational viscosity for each polyethylene according to Examples 1 to 2 and Comparative Examples 1 to 5 was measured at a Hencky rate of 0.1/s at 210° C. using an elongation viscosity fixture (EVF) which was attached to ARES rheometer.

In particular, a sample sheet was prepared by crosslinking 100 g of each polyethylene sample according to Examples 1 to 2 and Comparative Examples 1 to 5, 0.4 g of a phenolic antioxidant (AO), and 1.2 g of a crosslinking agent (DCP, dicumyl peroxide) at 190° C. for 10 min. Then, the crosslinked polyethylene (PE) elongational viscosity (210° C., 0.5 s, ×10$^3$) was measured by pulling a molten sample at a Hencky rate of 0.1/s at 210° C. with ARES-G2 manufactured by TA Instruments (New Castle, Delaware, USA) and elongation viscosity fixture (EVF) accessories.

6) MDR Torque (MH-ML, Nm):

The MDR torque of each polyethylene sample according to Examples 1 to 2 and Comparative Examples 1 to 5 was measured using MDR (Moving Die Rheometer) produced by Alpha Technologies.

In particular, a sample sheet was prepared with 100 g of each polyethylene sample according to Examples 1 to 2 and Comparative Examples 1 to 5, 0.4 g of a phenolic antioxidant (AO), and 1.2 g of a crosslinking agent (DCP, dicumyl peroxide) at 140° C. for 10 min. Then, an MH value and an ML value were measured using a moving die rheometer (MDR) at 180° C. for 10 min, and the MDR torque (MH-ML) was calculated by subtracting the ML value from the MH value. Here, the MH is a maximum vulcanizing torque measured at full cure, and the ML is a minimum vulcanizing torque stored.

7) Tensile Strength of CPE Compound (MPa):

Each chlorinated polyethylene (CPE) and chlorinated polyethylene (CPE) compound were prepared using the polyethylenes of Examples 1 to 2 and Comparative Examples 1 to 5 as follows, and then tensile strength (MPa) of each CPE compound was measured in accordance with the ASTM D 412 method under a condition of 500 mm/min.

Preparation of Chlorinated Polyethylene

5000 L of water and 550 kg of the high-density polyethylene prepared in Example 1 were added to a reactor, and then sodium polymethacrylate as a dispersant, oxypropylene and oxyethylene copolyether as an emulsifier, and benzoyl peroxide as a catalyst were added thereto. Then, the temperature was raised from 80° C. to 132° C. at a rate of 17.3° C./hr and chlorination was carried out by injecting gaseous chlorine at a final temperature of 132° C. for 3 hours. At this time, the chlorination reaction was performed by injecting the gaseous chlorine at a reactor pressure of 0.3 MPa while raising the temperature, and a total input of chlorine was 700 kg. The chlorinated reactant was neutralized with NaOH for 4 hours, washed again with running water for 4 hours, and finally dried at 120° C. to prepare a chlorinated polyethylene in a powder form.

In addition, chlorinated polyethylenes in a powder form were also prepared using the polyethylenes prepared in Example 2 and Comparative Examples 1 to 5 in the same manner as described above.

Preparation of Chlorinated Polyethylene Compound

25% by weight to 50% by weight of the chlorinated polyethylenes prepared using the polyethylenes prepared in Examples 1 to 2 and Comparative Examples 1 to 5, and 50% by weight to 70% by weight of an inorganic additive, such as talc, or carbon black, and the like, and 0.5% by weight to 10% by weight of a crosslinking agent were compounded and processed to prepare chlorinated polyethylene (CPE) compound specimens, respectively.

As described above, tensile strength (MPa) of the CPE compounds including the chlorinated polyethylenes prepared using the polyethylenes of Examples 1 to 2 and Comparative Examples 1 to 5 was measured in accordance with ASTM D 412 under a condition of 500 mm/min, and the results are shown in Table 1 below.

TABLE 1

|  | Example 1 | Example 2 | Comparative Example 1 | Comparative Example 2 | Comparative Example 3 | Comparative Example 4 | Comparative Example 5 |
|---|---|---|---|---|---|---|---|
| Density (g/cm$^3$) | 0.9508 | 0.9493 | 0.9581 | 0.9538 | 0.9517 | 0.951 | 0.950 |
| MI$_5$ (5 kg, 190° C., g/10 min) | 3.89 | 3.9 | 1.28 | 0.62 | 1.2 | 0.84 | 3.5 |
| Complex viscosity η*(ω500, Pa·s) | 900 | 900 | 750 | 850 | 850 | 1140 | 880 |
| <logMw 4.0 Area % | 4.3 | 4.8 | 12.1 | 3.9 | 5.4 | 2.6 | 3.59 |
| <logMw 4.5 Area % | 20.4 | 21.2 | 35.4 | 26.9 | 21.8 | 16.8 | 26.5 |
| Molecular weight distribution (Mw/Mn) | 2.7 | 3.2 | 8.9 | 6.2 | 5.4 | 4.5 | 3.9 |
| Elongational viscosity of crosslinked PE (210° C., 0.5 s, ×10$^5$ Pa·s) | 31.50 | 30.79 | 16.40 | 21.75 | 22.02 | 29.10 | 25.71 |

TABLE 1-continued

|  | Example 1 | Example 2 | Comparative Example 1 | Comparative Example 2 | Comparative Example 3 | Comparative Example 4 | Comparative Example 5 |
|---|---|---|---|---|---|---|---|
| MDR torque (MH-ML, Nm) | 13.4 | 13 | 5.6 | 10.2 | 9.3 | 12.9 | 8.9 |
| Tensile strength of CPE Compound (MPa) | 14.1 | 14 | 11.9 | 12.5 | 12 | 13.8 | 12.7 |

As shown in Table 1, as compared with Comparative Examples, Examples showed that the integral value of the region, where Log Mw was 4.0 or less, was 4.3% to 4.8% of the total integral value, and the integral value of the region, where Log Mw was 4.5 or less, was 20.4% to 21.2% of the total integral value, and the portion of the low molecular regions in the molecular structure were minimized and the medium/high molecular regions in the molecular structure were enhanced to have a narrow molecular weight distribution of 2.7 to 3.2, thereby exhibiting excellent processability during extrusion, together with high tensile strength, when applied to electric wires or cables, and the like.

Moreover, as compared with Comparative Examples, Examples showed that the CPE compounds had a tensile strength of 14.1 MPa and 14 MPa to ensure very excellent mechanical properties effective for use in electric wires or cables, and the like. Specifically, Examples 1 to 2 may ensure a high tensile strength under the polyethylene complex viscosity $\eta^*(\omega 500)$ of the equivalent level or less, as compared with Comparative Examples 1 to 3 and 5, thereby minimizing deterioration in processability during extrusion and providing a high-strength rubber hose, or cable sheath, and the like. In contrast, Comparative Example 4 had very high polyethylene complex viscosity $\eta^*(\omega 500)$, as compared with Examples, and thus there may be a problem in that processability deteriorates during extrusion. In particular, as in Comparative Example 5, when the low molecular region is not optimized in the GPC curve graph, even though the molecular weight distribution is narrow, tensile strength of the CPE compound may deteriorate. As in Comparative Example 4, when the molecular weight distribution is broad, even though the low molecular region is optimized in the GPC curve graph, viscosity may increase and processability may deteriorate.

The invention claimed is:
1. A polyethylene, having
an integral value of a region, where Log Mw is 4.0 or less, of 5.0% or less based on the total integral value, and an integral value of a region, where Log Mw is 4.5 or less, of 23% or less based on the total integral value, in a GPC curve graph having the x-axis of log Mw and the y-axis of dw/d log Mw; and
a molecular weight distribution (Mw/Mn) of 4.0 or less.
2. The polyethylene of claim 1, wherein the polyethylene is an ethylene homopolymer.
3. The polyethylene according to claim 1, which has an integral value of a region, where Log Mw is 4.0 or less, of 0.5% to 5.0% based on the total integral value, and an integral value of a region, where Log Mw is 4.5 or less, of 10% to 23% based on the total integral value, in a GPC curve graph having the x-axis of log Mw and the y-axis of dw/d log Mw.
4. The polyethylene of claim 1, wherein the polyethylene has a molecular weight distribution (Mw/Mn) of 2.0 to 4.0.

5. The polyethylene according to claim 1, wherein the polyethylene has a complex viscosity ($\eta^*(\omega 500)$) of 780 Pa·s to 950 Pa·s, as measured at a frequency ($\omega$) of 500 rad/s.
6. The polyethylene according to claim 1, wherein the polyethylene has a density of 0.945 g/cm$^3$ to 0.960 g/cm$^3$.
7. The polyethylene according to claim 1, wherein the polyethylene has a MI$_5$ of 0.8 g/10 min to 4.5 g/10 min, wherein MI$_5$ represents a melt index measured at 190° C. under a load of 5 kg.
8. The polyethylene according to claim 1, wherein an elongational viscosity of crosslinked polyethylene is 28×10$^5$ Pa·s or more, wherein the elongational viscosity is measured at 210° C. and 0.5 s.
9. The polyethylene according to claim 1, wherein the polyethylene has an MDR torque of 10 Nm or more, wherein the MDR torque is a maximum vulcanizing torque measured at full cure (MH)—minimum vulcanizing torque stored (ML), measured at 180° C. for 10 min.
10. A process for preparing the polyethylene according to claim 1, comprising the step of polymerizing ethylene in the presence of at least one first metallocene compound represented by the following Chemical Formula 1; and at least one second metallocene compound represented by the following Chemical Formula 2:

[Chemical Formula 1]

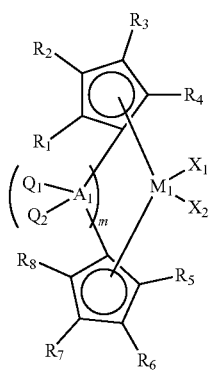

in Chemical Formula 1,
any one or more of $R_1$ to $R_8$ are —$(CH_2)_n$—OR, wherein R is $C_{1-6}$ linear or branched alkyl, and n is an integer of 2 to 6;
the rest of $R_1$ to $R_8$ are the same as or different from each other, and are each independently a functional group selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl; or two or more of the substituents that are adjacent to each other are connected with each other to form a $C_{6-20}$ aliphatic or aromatic ring unsubstituted or substituted with a $C_{1-10}$ hydrocarbyl group;
$Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_1$ is carbon, silicon, or germanium;

$M_1$ is a Group 4 transition metal;

$X_1$ and $X_2$ are the same as or different from each other, and are each independently halogen, $C_{1-20}$ alkyl, $C_{2-20}$ alkenyl, $C_{6-20}$ aryl, nitro group, amido group, $C_{1-20}$ alkylsilyl, $C_{1-20}$ alkoxy, or a $C_{1-20}$ sulfonate group; and m is an integer of 0 or 1,

[Chemical Formula 2]

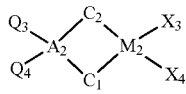

in Chemical Formula 2, $Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_2$ is carbon, silicon, or germanium;

$M_2$ is a Group 4 transition metal;

$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and any one of $C_1$ and $C_2$ is represented by the following Chemical Formula 3a or 3b, and the other is represented by the following Chemical Formula 3c, 3d, or 3e;

[Chemical Formula 3a]

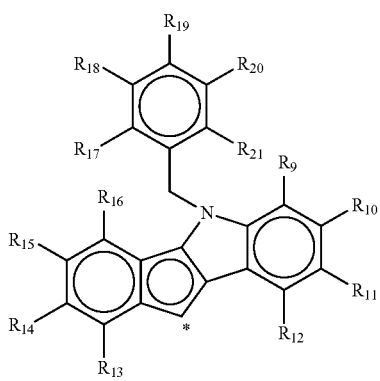

[Chemical Formula 3b]

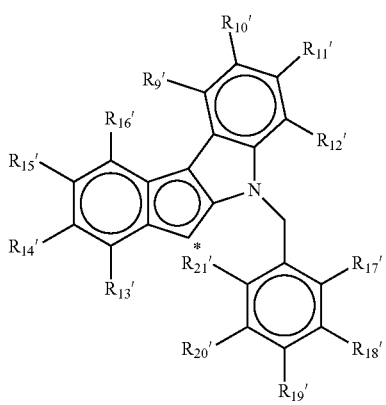

[Chemical Formula 3c]

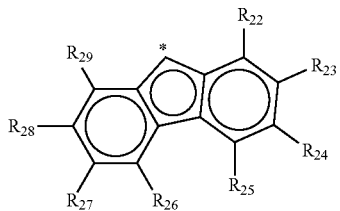

[Chemical Formula 3d]

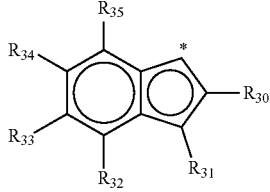

[Chemical Formula 3e]

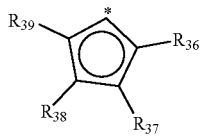

in Chemical Formulae 3a, 3b, 3c, 3d and 3e, $R_9$ to $R_{21}$ and $R_{17'}$ to $R_{21'}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that one or more of $R_{17}$ to $R_{21}$ or one or more of $R_{17'}$ to $R_{21'}$ are $C_{1-20}$ haloalkyl;

$R_{22}$ to $R_{39}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, or two or more of $R_{22}$ to $R_{39}$ that are adjacent to each other are connected with each other to form a $C_{6-20}$ aliphatic or aromatic ring unsubstituted or substituted with a $C_{1-10}$ hydrocarbyl group; and

* represents a site of binding to $A_2$ and $M_2$.

11. The process for preparing the polyethylene according to claim 10, wherein the first metallocene compound is represented by any one of the following Chemical Formulae 1-1 to 1-4:

[Chemical Formula 1-1]

[Chemical Formula 1-2]

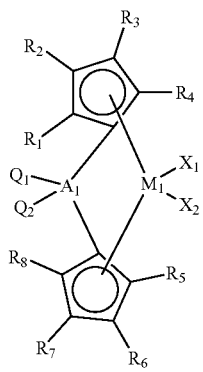

[Chemical Formula 1-3]

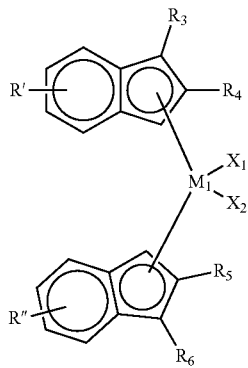

[Chemical Formula 1-4]

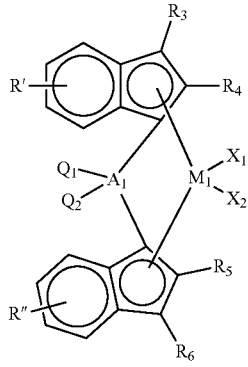

in Chemical Formulae 1-1 to 1-4,
$Q_1$, $Q_2$, $A_1$, $M_1$, $X_1$, $X_2$, and $R_1$ to $R_8$ are the same as defined in claim 10, and
R' and R" are the same as or different from each other, and are each independently a $C_{1-10}$ hydrocarbyl group.

12. The process for preparing the polyethylene according to claim 10, wherein $R_3$ and $R_6$ are each $C_{1-6}$ alkyl, or $C_{2-6}$ alkyl substituted with $C_{1-6}$ alkoxy.

13. The process for preparing the polyethylene according to claim 10, wherein the second metallocene compound is represented by the following Chemical Formula 2-1:

[Chemical Formula 2-1]

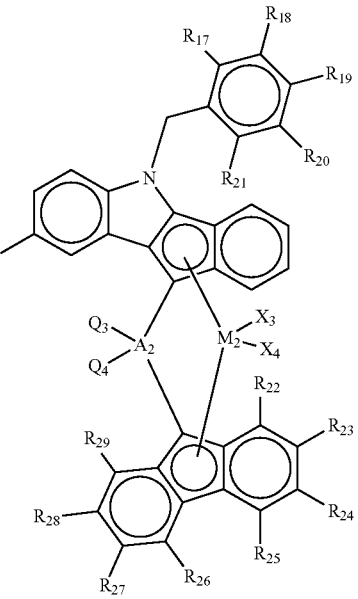

in Chemical Formula 2-1,
$Q_3$, $Q_4$, $A_2$, $M_2$, $X_3$, $X_{24}$, $R_{11}$, and $R_{17}$ to $R_{29}$ are the same as defined in claim 10.

14. The process for preparing the polyethylene according to claim 10, wherein $R_{17}$ to $R_{21}$ or $R_{17'}$ to $R_{21'}$ are each hydrogen, or $C_{1-6}$ haloalkyl, provided that any one or more of $R_{17}$ to $R_{21}$ or one or more of $R_{17'}$ to $R_{21'}$ are $C_{1-6}$ haloalkyl.

15. The process for preparing the polyethylene according to claim 10, wherein a weight ratio of the first metallocene compound and the second metallocene compound is 3:1 to 7:1.

16. The process for preparing the polyethylene according to claim 10, wherein the step of polymerizing is performed by introducing a hydrogen gas in an amount of 0.5 ppm to 50 ppm, based on the content of ethylene.

17. A chlorinated polyethylene prepared by reacting the polyethylene according to claim 1 with chlorine.

* * * * *